(12) United States Patent
Chen

(10) Patent No.: US 10,356,837 B2
(45) Date of Patent: Jul. 16, 2019

(54) STATE TRANSITIONING METHOD AND ELECTRONIC DEVICE USING THE SAME

(71) Applicant: Acer Incorporated, New Taipei (TW)

(72) Inventor: Hung-Chen Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/716,510

(22) Filed: Sep. 26, 2017

(65) Prior Publication Data

US 2018/0092157 A1    Mar. 29, 2018

Related U.S. Application Data

(60) Provisional application No. 62/401,174, filed on Sep. 29, 2016.

(51) Int. Cl.
*H04W 76/04* (2009.01)
*H04W 52/02* (2009.01)
*H04W 76/27* (2018.01)

(52) U.S. Cl.
CPC ......... *H04W 76/27* (2018.02); *H04W 52/028* (2013.01); *H04W 52/0222* (2013.01); *Y02D 70/00* (2018.01); *Y02D 70/142* (2018.01); *Y02D 70/144* (2018.01); *Y02D 70/20* (2018.01); *Y02D 70/26* (2018.01)

(58) Field of Classification Search
None
See application file for complete search history.

(56) References Cited

U.S. PATENT DOCUMENTS

| | | | |
|---|---|---|---|
| 2012/0120858 A1* | 5/2012 | Das | H04W 52/0229 370/311 |
| 2012/0281566 A1 | 11/2012 | Pelletier et al. | |
| 2013/0260740 A1 | 10/2013 | Rayavarapu | |
| 2014/0036795 A1* | 2/2014 | Martinez Tarradell | H04W 4/70 370/329 |
| 2016/0205703 A1* | 7/2016 | Dudda | H04W 76/38 455/452.1 |

(Continued)

OTHER PUBLICATIONS

Mikko Saily et al., "Mobile and wireless communications Enablers for the Twenty-twenty Information Society-II", Deliverable D6.1 Draft Asynchronous Control Functions and Overall Control Plane Design, Jun. 30, 2016, pp. 1-120.

(Continued)

*Primary Examiner* — Candal Elpenord
(74) *Attorney, Agent, or Firm* — JCIPRNET

(57) ABSTRACT

The disclosure is directed to a state transitioning method for switching between a connected state and an inactive state and related apparatuses using the same. In one of the exemplary embodiments, the disclosure is directed to a state transitioning method used by a user equipment (UE) for switching between a connected state and an inactive state. The method would include not limited to: establishing a wireless connection to enter into a connected state; receiving an inactive state command while being in the connected state; entering into the inactive state in response to receiving the inactive state command; transmitting a connection resume request while being in the inactive state; receiving an uplink (UL) grant which corresponds to the connection resume request; and transmitting UL data in response to receiving the UL grant.

19 Claims, 23 Drawing Sheets

(56) References Cited

U.S. PATENT DOCUMENTS

| | | | |
|---|---|---|---|
| 2016/0374048 A1* | 12/2016 | Griot | H04W 4/70 |
| 2017/0290072 A1* | 10/2017 | Chen | H04W 76/10 |
| 2017/0318606 A1* | 11/2017 | Lee | H04L 67/12 |
| 2018/0049244 A1* | 2/2018 | Lee | H04W 76/27 |
| 2019/0020998 A1* | 1/2019 | Takahashi | H04W 76/19 |

OTHER PUBLICATIONS

Ericsson, "Infrequent small data transmissions for inactive UEs", 3GPP TSG-RAN WG2 #94, Tdoc R2-164028, May 22, 2016, pp. 1-5.

Catt, "Support Data Transmission in Inactive State", 3GPP TSG RAN WG2 Meeting #95, R2-164807, Aug. 21, 2016, pp. 1-9.

Catt, "Characteristics of Inactive State", 3GPP TSG RAN WG2 Meeting #95, R2-164805, Aug. 21, 2016, pp. 1-9.

"Search Report of Europe Counterpart Application", dated Feb. 5, 2018, p. 1-p. 14, in which the listed references were cited.

"3rd Generation Partnership Project; Technical Specification Group Radio Access Network; NR; NR and NG-RAN Overall Description; Stage 2 (Release 15)," 3GPP TS 38.300 V1.0.0, Sep. 2017, pp. 1-59.

"3rd Generation Partnership Project; Technical Specification Group Radio Access Network; Study on Scenarios and Requirements for Next Generation Access Technologies; (Release 14)," 3GPP TR 38.913 V14.3.0, Jun. 2017, pp. 1-39.

ITRI, "State Transition between Connected and Inactive," 3GPP TSG-RAN WG2 Meeting#96, Tdoc R2-168067, Nov. 14-18, 2016, pp. 1-5.

ITRI, "Discussion on State Transition between Connected and Inactive," 3GPP TSG-RAN WG2 NR Ad Hoc, Tdoc R2-1700258, Jan. 17-19, 2017, pp. 1-5.

ITRI, "RRC State Transition between Connected and Inactive," 3GPP TSG-RAN WG2 Meeting #97, Tdoc R2-1701343, Feb. 13-17, 2017, pp. 1-4.

ETSI MCC, "The RRC state transition from Connected to Inactive follows one step procedure," and "As a baseline, RRC state transition from Inactive to Connected follows three-step procedure (e.g. request, response, complete),etc." Report of 3GPP TSG RAN WG2 meeting #98, R2-1707601, subclause 10.4.1.2, Agreement 2 and Agreement 3, May 15-19, 2017, pp. 1-293.

\* cited by examiner

STATE TRANSITIONING METHOD AND
ELECTRONIC DEVICE USING THE SAME

CROSS-REFERENCE TO RELATED
APPLICATION

This application claims the priority benefit of U.S. provisional application Ser. No. 62/401,174, filed on Sep. 29, 2016. The entirety of the above-mentioned patent application is hereby incorporated by reference herein and made a part of this specification.

TECHNICAL FIELD

The disclosure is directed to a state transitioning method for switching between a connected state and an inactive state, a user equipment using the same, and a base station using the same.

BACKGROUND

One of the important key performance indicators of new radio (NR) technology is control plane latency from a power efficient state to a data transmission state. Preferably, the latency would be less than 10 milliseconds. For NR, a new radio resource control (RRC) state has been introduced to satisfy the above described purpose. Conventionally, RRC states include a RRC connected state during which an electronic device is connected to the network and a RRC idle state during which the electronic device is not connected to the network and could be in a power off state or a sleep state. Recently, a new RRC state in addition to the above described RRC states has been proposed, and the new state is referred to as the "RRC inactive state" (RRC_INACTIVE). The RRC inactive state could be implemented within a network which utilizes the NR technology, and such network would be introduced as follows.

FIG. 1 illustrates a hypothetical next generation (NG) radio access network (RAN), or NG-RAN for implementing RAN-based notification area (RNA). The network may include a Core Network (CN) 101 communicating with a NG-RAN. The CN 101 is assumed to include a control plane (CP) controller (or anchor) 102 and a user plane (UP) controller (or anchor) 103. Although the NG-RAN has not adopted the concept of Anchor nodes and Candidate nodes, for illustration purposes, the NG-RAN of FIG. 1 is assumed to include an Anchor Node 111 and at least one Candidate Node 112 113. The Anchor Node is a node that maintains a CP connection 104 and a UP connection 105 to the CN 101 while a UE 121 connects to a cell belonging to it in the active state. The RAN-based Notification Area (RNA) is the area that the UE 121 is configured to perform the mobility without notifying the network. For instance, the RNA may include not limited to the coverage range of the Anchor node 111 and the Candidate Nodes 112 113. The UE 121 may select a cell within the RNA to connect to the NG-RAN while the UE 121 has UL data to be transmitted. A Candidate Node 111 is a node that corresponds to a cell including in the RAN-based notification area. At least a cell including in the RAN-based notification belongs to the Anchor Node. The CP anchor 102 is an entity within the CN 101 to interact with the CP such as a mobility management entity (MME) in the Evolved Packet Core (EPC). The UP anchor 103 is an entity of the CN 101 to interact with the data plane such as a serving gateway (S-GW) in the EPC. A connecting node (e.g. 111, 112 113) could be any node which the UE connects to within the RNA by performing a random access (RA) procedure.

The RRC inactivate state is a state where a mobile electronic device or user equipment (UE) may move within an area configured by a NG-RAN without notifying the NG-RAN. Also under such state, the anchor node may keep the UE context and the UE-associated NG connection with the serving AMF (Access and Mobility Management Function) and UPF (User Plane Function). The UE 121 would notify the network if the UE 121 moves out of the configured RNA. Thus, the characteristics of the RRC inactive state would include maintaining connections of both CP 104 and UP 105 between the NG-RAN and the CN 101 for associated the UE in the RRC inactivate state. Also under such state, a NG-RAN initiated notification procedure would be used to reach UE 121. Further, notification related parameters would be configured by the NG-RAN itself. When the UE 121 is in the RRC inactive state, the NG-RAN would be aware of the UE 121 moving from one RNA to another.

To order to implement the RRC inactive state, there are currently unresolved issues. For instance, it is uncertain under which circumstance a UE in general would be configured to enter the RRC inactive state from a network's point of view. How RNAs could be arranged have not been specified. Moreover, it is unclear how to process the tradeoff between network burdens and UE power consumptions. Considering the uncertainties, a mechanism for a UE to switch between a RRC connection state and a RRC inactive state to address the above described issues would still need to be proposed.

SUMMARY OF THE DISCLOSURE

Accordingly, the disclosure is directed to a state transitioning method for switching between a connected state and an inactive state and related apparatuses using the same.

In one of the exemplary embodiments, the disclosure is directed to a state transitioning method used by a user equipment (UE) for switching between a connected state and an inactive state. The method would include not limited to: establishing a wireless connection to enter into a connected state; receiving an inactive state command while being in the connected state; entering into the inactive state in response to receiving the inactive state command; transmitting a connection resume request while being in the inactive state; receiving an uplink (UL) grant which corresponds to the connection resume request; and transmitting UL data in response to receiving the UL grant.

In one of the exemplary embodiments, the disclosure is directed to a user equipment which would include not limited to: a wireless transceiver; and a processor coupled to the transceiver and configured to: configuring a connected state to establish a wireless connection; and transmitting an inactive state command in response to configuring the connected state.

In one of the exemplary embodiments, the disclosure is directed to a state transitioning method used by a base station for switching between a connected state and an inactive state. The method would include not limited to: establish, via the transceiver, a wireless connection to enter into a connected state; transmit, via the transceiver, an inactive preference indication which indicates a preference for switching from the connected state to an inactive state; and receive, via the transceiver, an inactive state command in response to transmitting the inactive preference indication; and enter into the inactive state.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
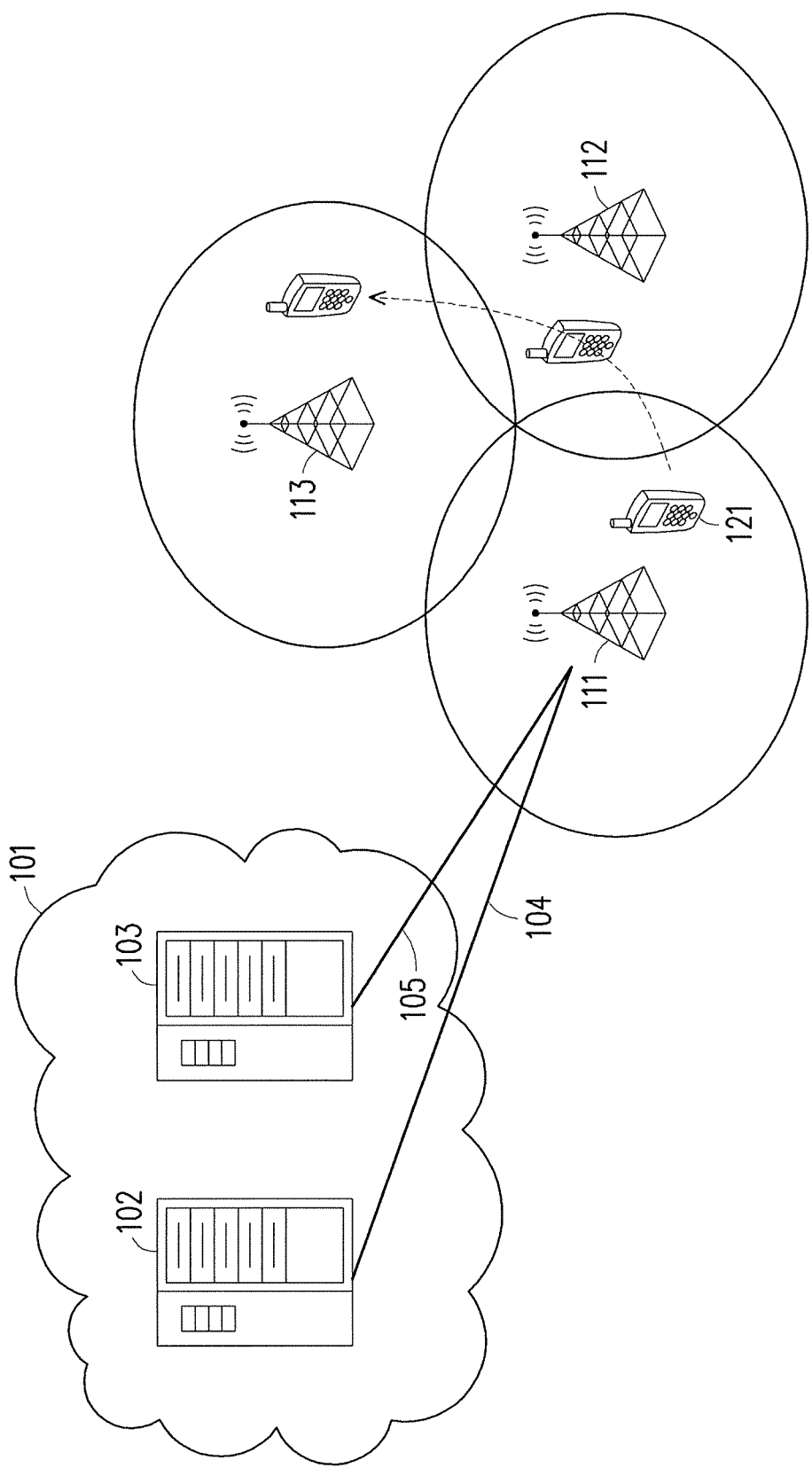
FIG. 1 illustrates a hypothetical NG-RAN in which a mobile electronic device migrates from one RNA to another RNA.

Reference will now be made in detail to the present exemplary embodiments of the disclosure, examples of which are illustrated in the accompanying drawings. Wherever possible, the same reference numbers are used in the drawings and the description to refer to the same or like parts.

Considering the above described uncertainties, the subsequent disclosure provides an overview of proposed concepts and then various exemplary embodiments.

One issue is that whether and when a UE should be configured to enter the RRC inactive state is uncertain from the network point of view. Also, how to arrange the RAN-based notification area for a UE may also needed to be considered. For a UE in the RRC inactive state, multiple connecting nodes would need to keep the UE identity as well as its context and/or configuration for a period. The Anchor node would need to also maintain the connection of both CP and UP between the NG-RAN and the CN.

For example, for a UE intending to implement Ultra-Reliable and Low-Latency Communication (URLLC) service with full power, the CN may consider keeping the UE in the RRC connected state. For another example, for a UE intending to implement URLLC service with lower power, the CN may consider switching the UE to the RRC inactive state. Similarly, for a UE intending to implement on infrequent small data transmission, the CN may consider switching the UE to the RRC inactive state. Also, for a UE in a high mobility state, the CN may arrange a wider RNA for the UE.

One approach proposed by this disclosure is for the UE to provide an inactive preference indication to a connecting node to trigger or to indicate preferences related to whether to enter the RRC inactive state and/or receiving the RNA in which the RRC inactive could be applicable to. The inactive preference indication may further include UE status information such as inactive preference (e.g. yes or no), power condition, targeting service type, mobility state, UE category, etc.

Figure 2:
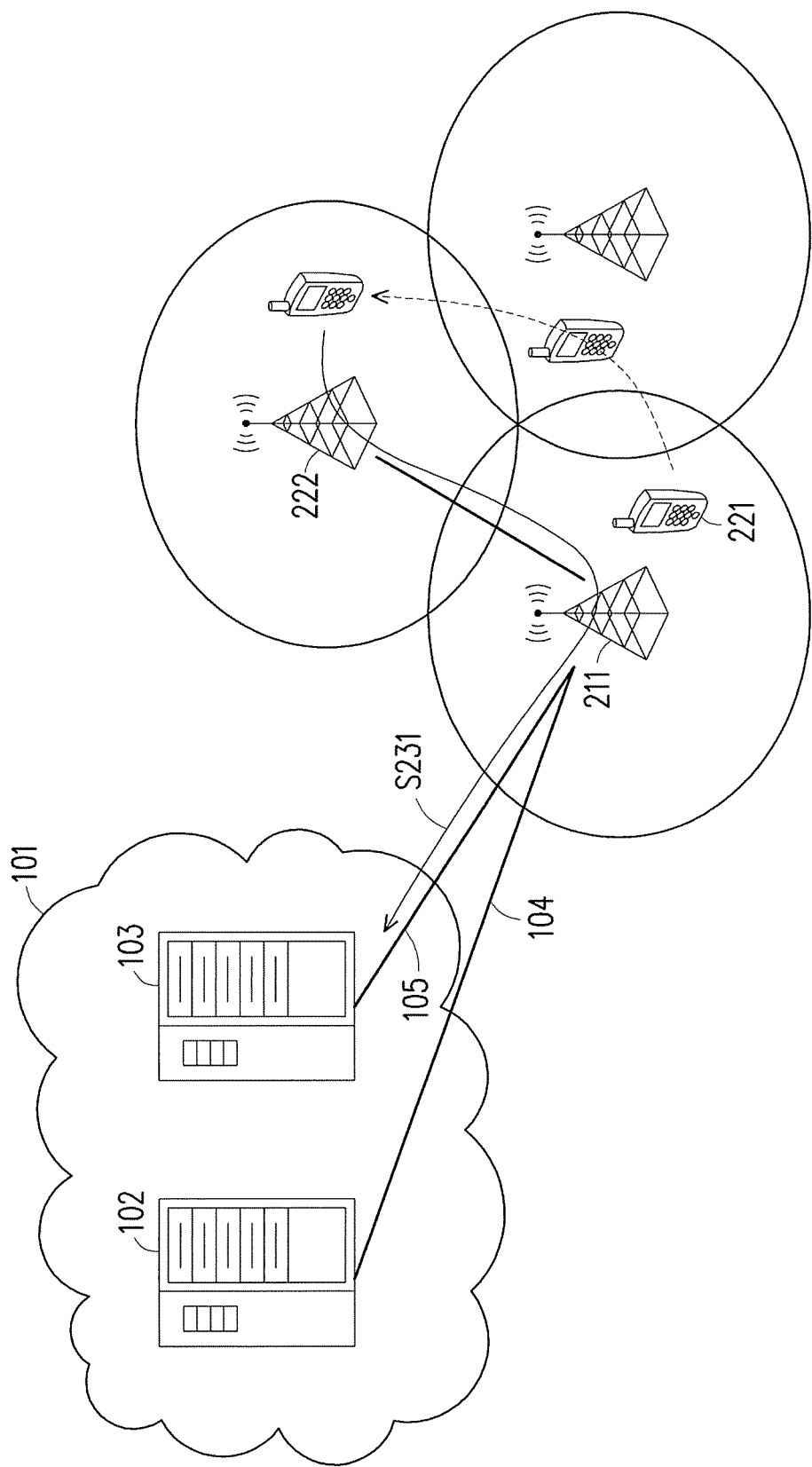
FIG. 2 illustrates transmitting small data as a mobile electronic device migrates from one RNA to another RNA in accordance with one of the exemplary embodiments of the disclosure.
Figure 3:
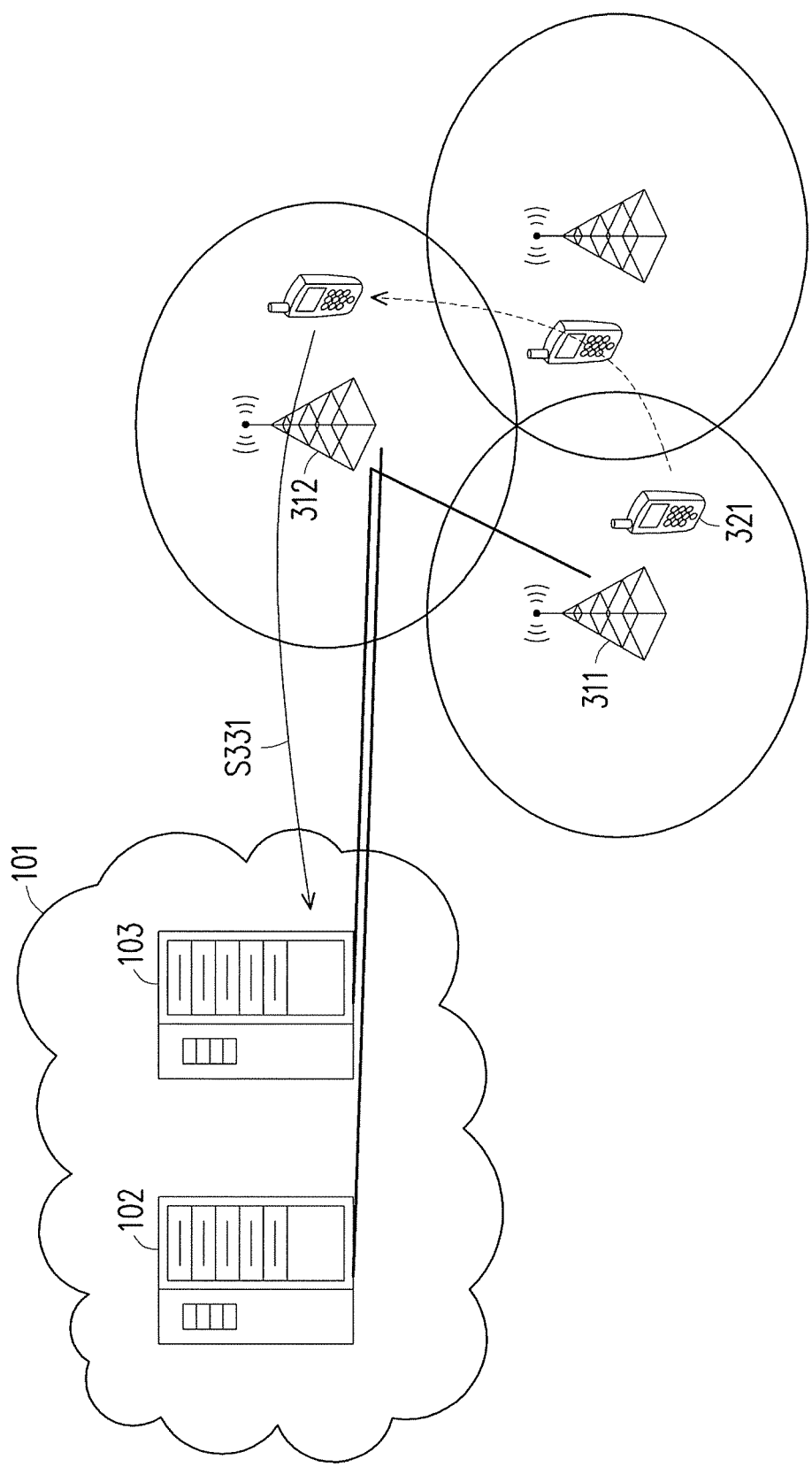
FIG. 3 illustrates transmitting large data as a mobile electronic device migrates from one RNA to another RNA in accordance with one of the exemplary embodiments of the disclosure.

The disclosure also proposes whether and when to switch the connection of both CP and UP between a NG RAN and a CN. For a UE that has been in the RRC inactive state but has UL data to be transmitted, the CN signaling overhead could be implemented as follows. Similar to the mechanism of FIG. 1, the UE may select a cell within the RNA to connect to the NG-RAN while the UE has UL data to be transmitted. If the UE has selected an Anchor node to transmit the UL data, no path update procedure to switch the CP and UP connection is required. Referring to the scenario of FIG. 2, If the UE 221 has selected another connection node, namely a Candidate node 222 which is involved in the RNA of the UE 221, it could be wasteful for the UE 221 to transmit only small UL data (by considering the packet size and the service characteristics of the small data) and to implement the path update procedure to switch the CP and the UP. Thus, in step S231, the Candidate node 222 could forward the UL small data to the Anchor node 211. For the scenario of FIG. 3, if the UE 321 has selected another connection node, namely a Candidate node 312 which is involved in the RNA, it could be necessary to transmit large data (by considering the packet size and the service characteristics of the large data) and to implement the path update procedure to switch the CP and the UP connection. The UE 321 may experience data latency if the UP connection between the NG-RAN and the CN is not switched from the Anchor node 311 to the Candidate node 312.

One approach proposed by this disclosure is for the network to transmit an inactive state command which includes necessary information for the UE to turn to the RRC connected state. This could be accomplished by, for example, an indication of configuration preservation and network criteria for a setting small data indication. Thus, the UE may provide a small data indication and/or mobility state to a connecting node for determining whether a path update procedure would be required.

How to quickly switch from RRC connected state to RRC inactive state after a UL data transmission would also need to be considered for power saving. If a UE transmit only small UL data, the UE could be allowed to switch to the RRC inactive state without additional signaling. One approach proposed by this disclosure is to allow automatic UE behavior to avoid additional signaling to switch back to the RRC inactive state. The RRC resume procedure could thus be reduced to one step according to network decision.

Mechanisms for switching between RRC connected state and RRC inactive state are summarized as follows. For switching from RRC connected state to RRC inactive state, the network side may receive the inactive preference indication from a UE. A connection node may send the UE Context Forward Request to request neighboring connection nodes to be the Candidate nodes for a UE which is in RRC inactive state. The UE Context Forward Request may include the inactive identity of a UE, RRC/L2/L1 configuration, or UE status information. The inactive identity could be a combination of Physical Cell Identity (PCI) (of the current serving cell) and the Cell Temporary Network Identifier (C-RNTI), the combination of Anchor node ID (of the current serving cell) and the C-RNTI, the International Mobile Subscriber Identity (IMSI) of the UE, or Public International Mobile Subscriber Identity (P-TMSI) of the UE. A connection node may receive the UE Context Forward Ack if a neighboring connection node agrees to be the candidate node of a UE in inactive state. A connection node may receive the UE Context Forward Nack if a neighboring connection node disagrees to be a Candidate node of a UE which is in the RRC inactive state.

For switching from RRC inactive state to RRC connected state, from the UE perspective, the UE may send a small data indication and/or mobility state to a Candidate node. The setting of the small data indication and/or mobility state may follow the network criteria provided in the previously received Inactive Preference Command or provided in the broadcasting information. The setting of small data indication and/or mobility state may rely on UE implementation. The small data indication and/or mobility state may be transmitted in msg3 (e.g. RRC connection Resume Request) or other messages after receiving a Preamble Response. The small data indication and/or mobility state may be transmitted with the first UL data Transmission (using piggybacking). A UE may not need to send Buffer Status Report (BSR) for small data transmission as the network might grant a predefined size of UL resources for small data transmission (e.g. when small data indication=true). A UE may autonomously transmit to the RRC inactive state (e.g. when small data indication=true). A UE may send the Inactive Preference Indication including the UE status information such as power condition, targeting service type, mobility state, and/or UE category to the connection node which could be the Anchor node or a Candidate node.

For switching from RRC inactive state to RRC connected state, from the network perspective, a connection node may receive a RRC Connection Resume Request having the inactive identity from a UE that switches from the inactive state to the connected state. A connection node may grant the UL resource for data transmission according to the predefined size for small data transmission or the received BSR. A connection node may receive a small data indication and/or mobility state from a UE. A connection node may deliver UL data to the anchor node of a UE via the interface between connection nodes. A connection node may perform path update procedure to change the user plane connection and/or control plane connection to the core network from another connection node to itself.

Figure 22:
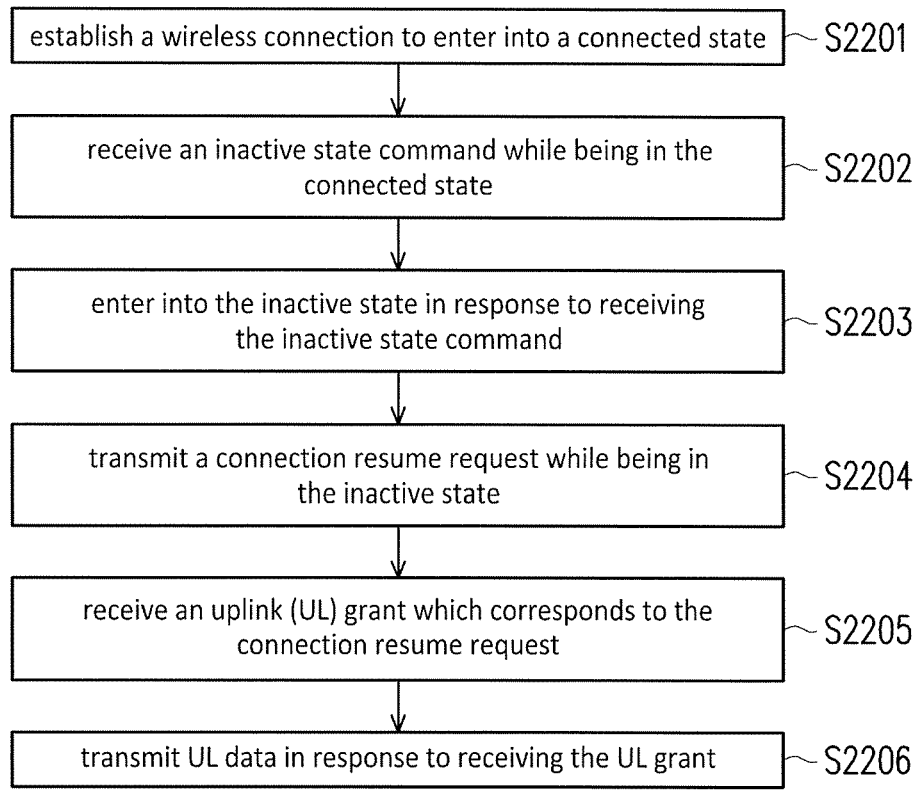
FIG. 22 illustrates a method of state transition between a connected state and an inactive state from the perspective of an electronic device within a wireless communication system in accordance with one of the exemplary embodiments of the disclosure.

FIG. 22 illustrates a method of state transition between a connected state and an inactive state from the perspective of a user equipment (UE) within a wireless communication system in accordance with one of the exemplary embodiments of the disclosure. In step S2201, the UE would establish a wireless connection to enter into a connected state. In step S2202, the UE would receive an inactive state command while being in the connected state. In step S2203, the UE would enter into the inactive state in response to receiving the inactive state command. In step S2204, the UE would transmit a connection resume request while being in the inactive state. In step S2205, the UE would receive an uplink (UL) grant which corresponds to the connection resume request. In step S2206, the UE would transmit UL data in response to receiving the UL grant.

Figure 23:
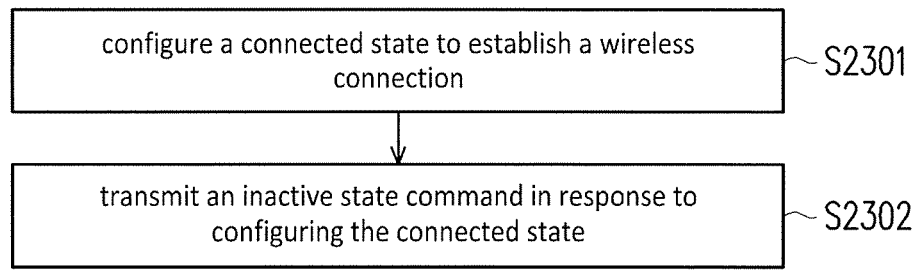
FIG. 23 illustrates a method of state transition between a connected state and an inactive state from the perspective of a base station within a wireless communication system in accordance with one of the exemplary embodiments of the disclosure.

FIG. 23 illustrates a method of state transition between a connected state and an inactive state from the perspective of a base station within a wireless communication system in accordance with one of the exemplary embodiments of the disclosure. In step S2301, the base station would configure a connected state to establish a wireless connection. In step S2302, the base station would transmit an inactive state command in response to configuring the connected state.

Figure 24:
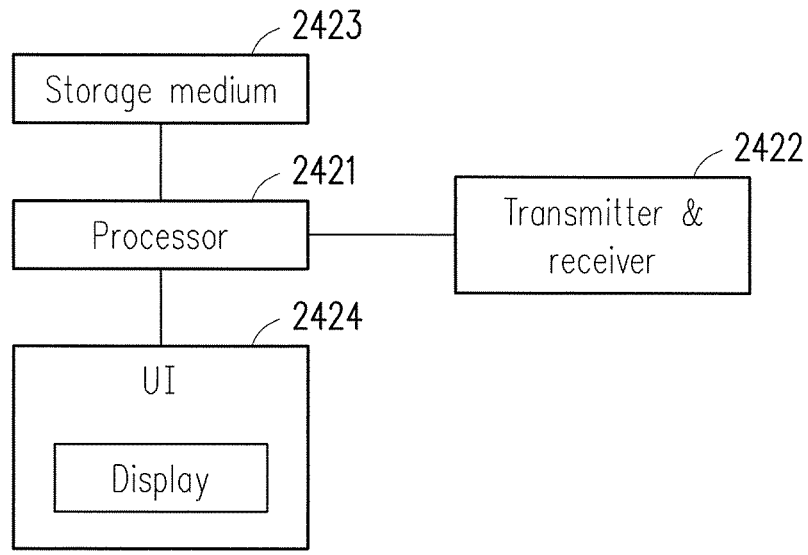
FIG. 24 illustrates an electronic device in accordance with one of the exemplary embodiments of the disclosure.

FIG. 24 illustrates the hardware diagram of a UE in accordance with one of the exemplary embodiments of the disclosure. The term UE in this disclosure could be a personal computer (PC), a mobile electronic device, a mobile station, an advanced mobile station (AMS), a server, a client, a desktop computer, a laptop computer, a network computer, a workstation, a personal digital assistant (PDA), a tablet, a scanner, a (smart) telephone device, a watch, a pager, a camera, a television, a hand-held video game device, a musical device, a wireless sensor, a drone, and the like. In some applications, a UE may be a fixed computer device operating in a mobile environment, such as a bus, a train, an airplane, a boat, a car, and so forth.

The structure of the UE would include not limited to a processor 2421 coupled to a transmitter and/or receiver (transceiver) 2422, a storage medium 2423, and optionally a user interface (UI) 2424 which may or may not contain a display. The transmitter and/or receiver 2422 are controlled by the processor 2421 to down-convert radio frequency signals (RF) (or millimeter wave signals) received from an antenna (array) into baseband signals to be processed by the processor 2421 and are controlled by the processor 2421 to up-convert baseband signals into RF or millimeter wave signals to be transmitted through the antenna (array). The transmitter and/or receiver 2422 may also include one or more sets of hardware tuned to different frequency bands such as RF frequency, millimeter frequency, Bluetooth frequency, WiFi frequency, and so forth. The storage medium 2423 contains temporary and/or permanent storage medium for storage of temporarily buffered data or for permanent (non-volatile) data storage. The processor 2421 would include one or more may include one or more hardware processing units such as processors, controllers, or discrete integrated circuits to implement the disclosed mechanism of state transition between connected and inactive state for a UE.

Figure 25:
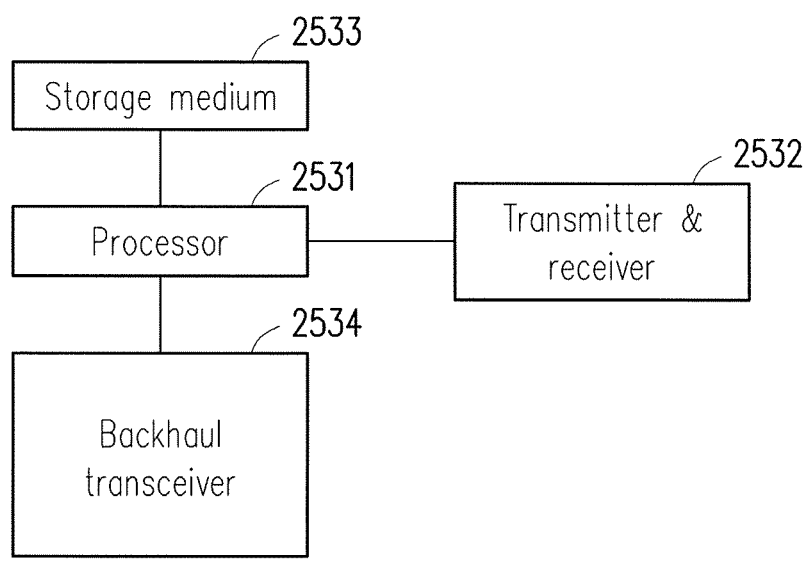
FIG. 25 illustrates a base station in accordance with one of the exemplary embodiments of the disclosure.

FIG. 25 illustrates the hardware diagram of a base station (BS) in accordance with one of the exemplary embodiments of the disclosure. The term BS in this disclosure could be a variation or a variation or an advanced version of a 5G BS, macro cell BS, micro cell BS, pico cell BS, femto cell BS, "eNodeB" (eNB), a Node-B, an advanced BS (ABS), a base transceiver system (BTS), an access point, a home BS, a relay station, a scatterer, a repeater, an intermediate node, an intermediary, satellite-based communication BSs, and so forth.

The structure of the BS would include not limited to would include not limited to a processor 2531 coupled to a transmitter and/or receiver (transceiver) 2532, a storage medium 2533, and a backhaul transceiver 2534. The transmitter and/or receiver 2532 are controlled by the processor 2531 to down-convert radio frequency signals (RF) (or millimeter wave signals) received from an antenna (array) into baseband signals to be processed by the processor 2531 and are controlled by the processor 2531 to up-convert baseband signals into RF or millimeter wave signals to be transmitted through the antenna (array). The storage medium 2533 contains temporary and/or permanent storage medium for storage of temporarily buffered data or for permanent (non-volatile) data storage. The backhaul transceiver 2534 may include one or more transceivers (e.g. S1 interface) for communicating with the core network and/or one or more inter-base station interfaces (e.g. X2) for communicating with another base station. The processor 2531 would include one or more may include one or more hardware processing units such as processors, controllers, or discrete integrated circuits to implement the disclosed mechanism of state transition between connected and inactive state for a base station.

Figure 4:
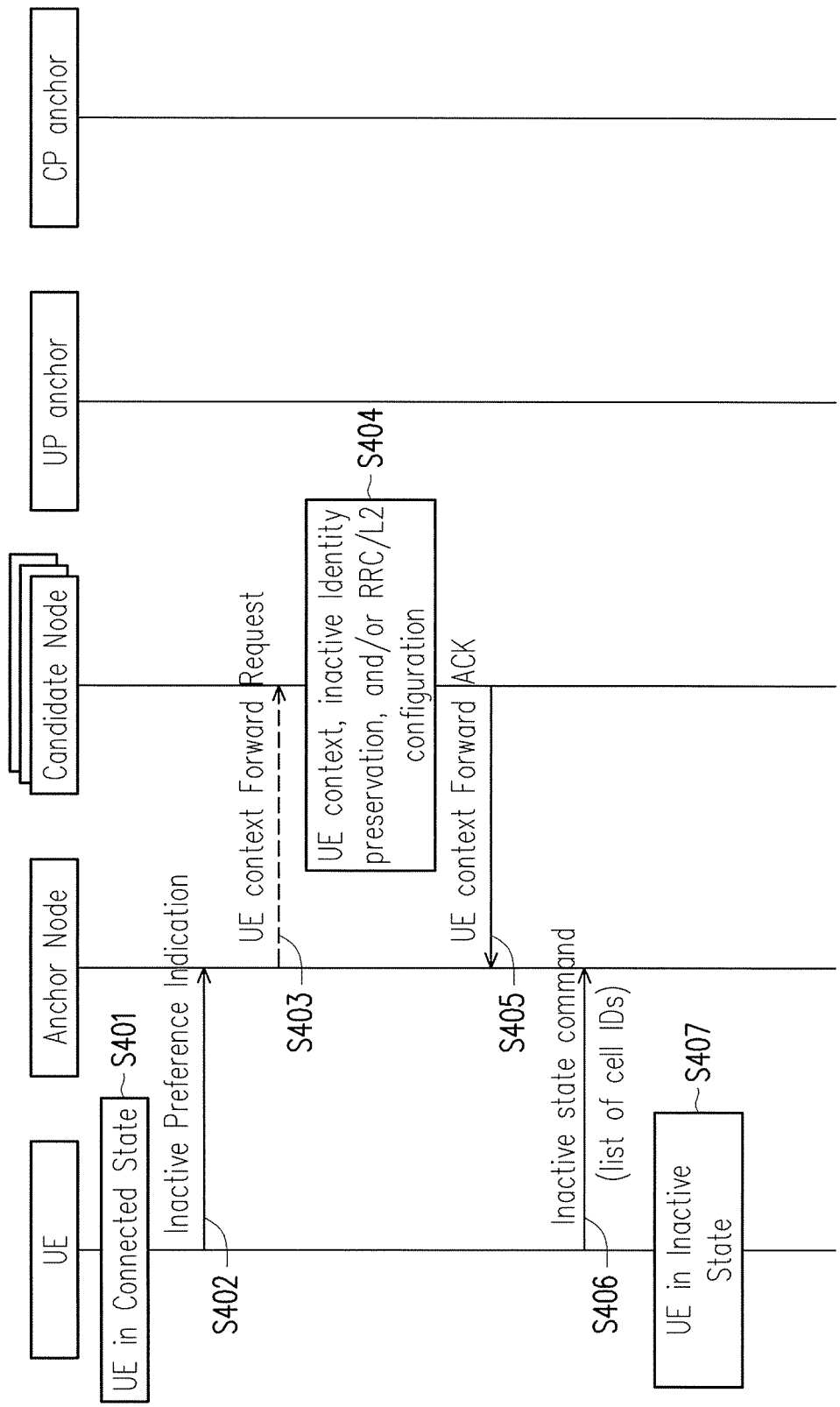
FIG. 4 illustrates a UE that receives a simple inactive state command while switching from a connected state to an inactive state in accordance with one of the exemplary embodiments of the disclosure.

The disclosure provides various exemplary embodiments as shown in FIG. 4~FIG. 21 and their corresponding written descriptions to further elucidate the above described concepts. FIG. 4 illustrates a UE that receives a simple inactive state command in accordance with one of the exemplary embodiments of the disclosure. In step S401, the UE is assumed to have already entered a connected state. For a UE in the connected state, the UE could be configured to send an inactive preference indication autonomously or the network could request the UE to send the inactive preference indication. In step S402, the UE would transmit to the Anchor node the inactive preference indication which may include any one or a combination of a UE status information, a power condition, a targeting service type, a mobility state, and a UE category. The UE status information may include an inactive state preference such as a binary bit indicating yes or no.

In response to receiving the inactive preference indication, the connecting node which could be an Anchor node would determine whether to switch the UE to the inactive state. Alternatively, the connecting node may also be a Candidate node. If the connecting node has determined to switch the UE to the inactive state, the connecting node may need to prepare the RNA for the UE to operate in the inactive state. In step S403, the connect node would transmit to a neighboring node, which could be the Candidate node, a UE Context Forward Request to ask the Candidate node to service the UE which will be in the inactive state. The UE Context Forward Request may include any one or a combination of the inactive identity of the UE, RRC/L2/L1 configuration, and the UE status information. The inactive identity could be any one or a combination of the PCI of the current serving cell of the UE, the C-RNTI of the UE, the IMSI of the UE, and the P-TSMI of the UE.

In response to receiving the UE Context Forward Request, in step S404, the neighboring node that receives such request would determine whether to process or to ignore the UE Context Forward Request. Assuming that the neighboring node agrees to process the UE Context Forward Request, the neighboring would store the any one or the combination inactive identity of the UE, the RRC/L2/L1 configuration, and the UE status information. In step S405, the neighboring node would transmit back to the connecting node a UE Context Forward Ack. In response to receiving the UE Context Forward Ack, the connecting node would arrange the RNA for the UE. In step S406, the connecting node would then transmit to the UE an inactive state command which may include a list of cell identifications (IDs). The cell IDs could be the physical cell ID of the cell in the RNA. In response to receiving the inactive state command, in step S407, the UE would switch from the connected state to the inactive state.

According to an alternative exemplary embodiment which is the same as the exemplary embodiment of FIG. 4 except as follows. Upon receiving the UE Context Forward ACK from the neighboring node of step S405, the connecting node may arrange the RNA for the UE and send an inactive state command to the UE. The inactive state command would include a list of area IDs. A cell with an area ID included in the list of area IDs would be a RNA. The area ID of a cell could be broadcasted by the cell.

According to an alternative exemplary embodiment, the inactive state command may further include the ID (i.e. anchor node ID) of the anchor node serving the UE for the usage of inactive identity.

Figure 5:
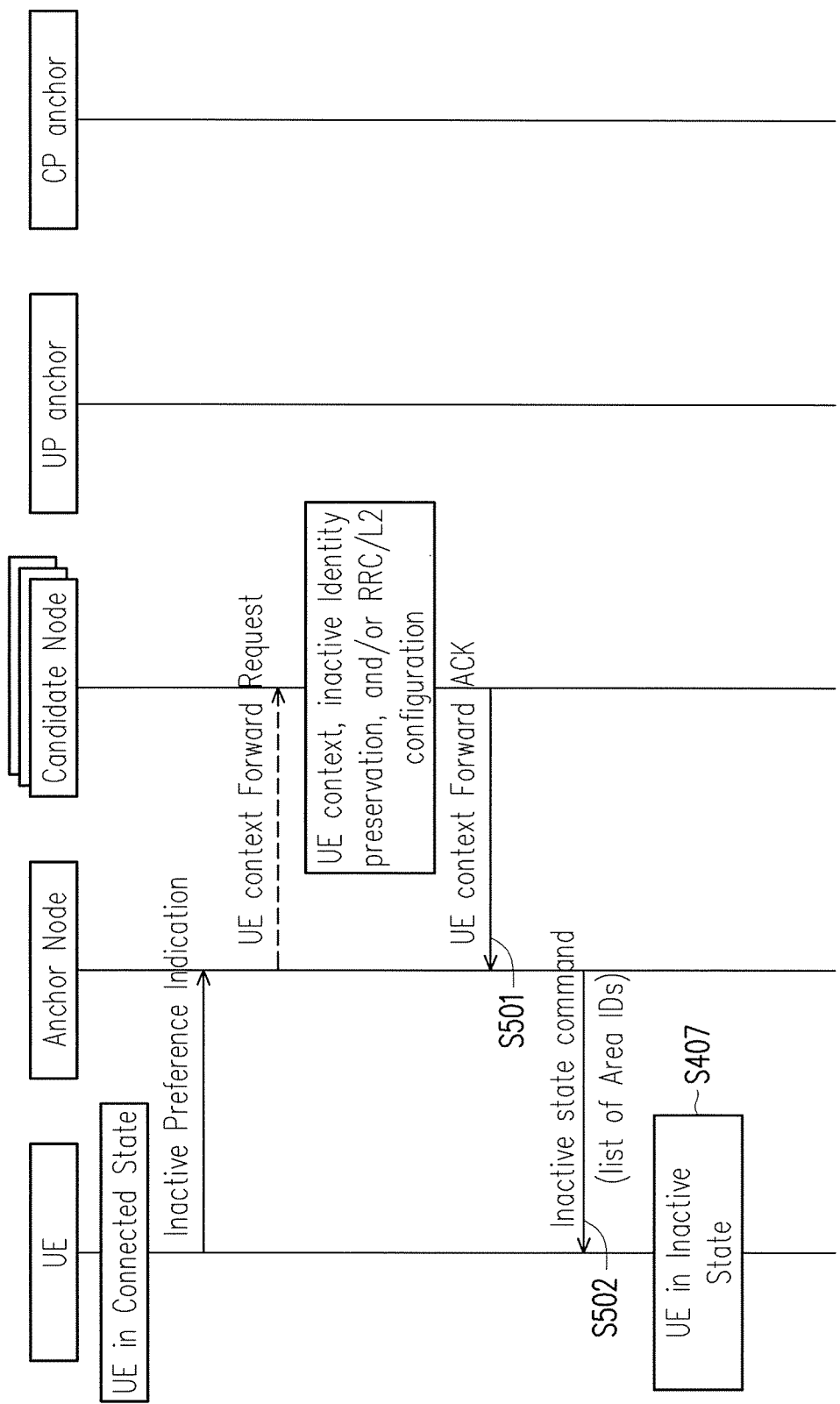
FIG. 5 illustrates a UE that receives a simple inactive state command while switching from a connected state to an inactive state in accordance with another one of the exemplary embodiments of the disclosure.

FIG. 5 illustrates a UE that receives a simple inactive state command in accordance with one of the exemplary embodiments of the disclosure. This exemplary embodiment is the same as the exemplary embodiment of FIG. 4 except as follows. In step S501, in response to receiving the UE Context Forward Ack, the connecting node would arrange the RNA for the UE. In step S502, the connecting node would transmit an inactive state command to the UE. The inactive state command may include a list of area IDs. A cell having an area ID in the list of area IDs is in the RNA. The area ID of a cell could be broadcasted by the cell. The inactive state command may further include any one or a combination of network criteria (e.g. data inter-arrival time), a threshold for determining mobility state, a threshold of an amount of data, and storing current RRC/L2/L1 configuration as a guideline for the UE to provide an assistance information while the UE is switched back to connected state.

Figure 6:
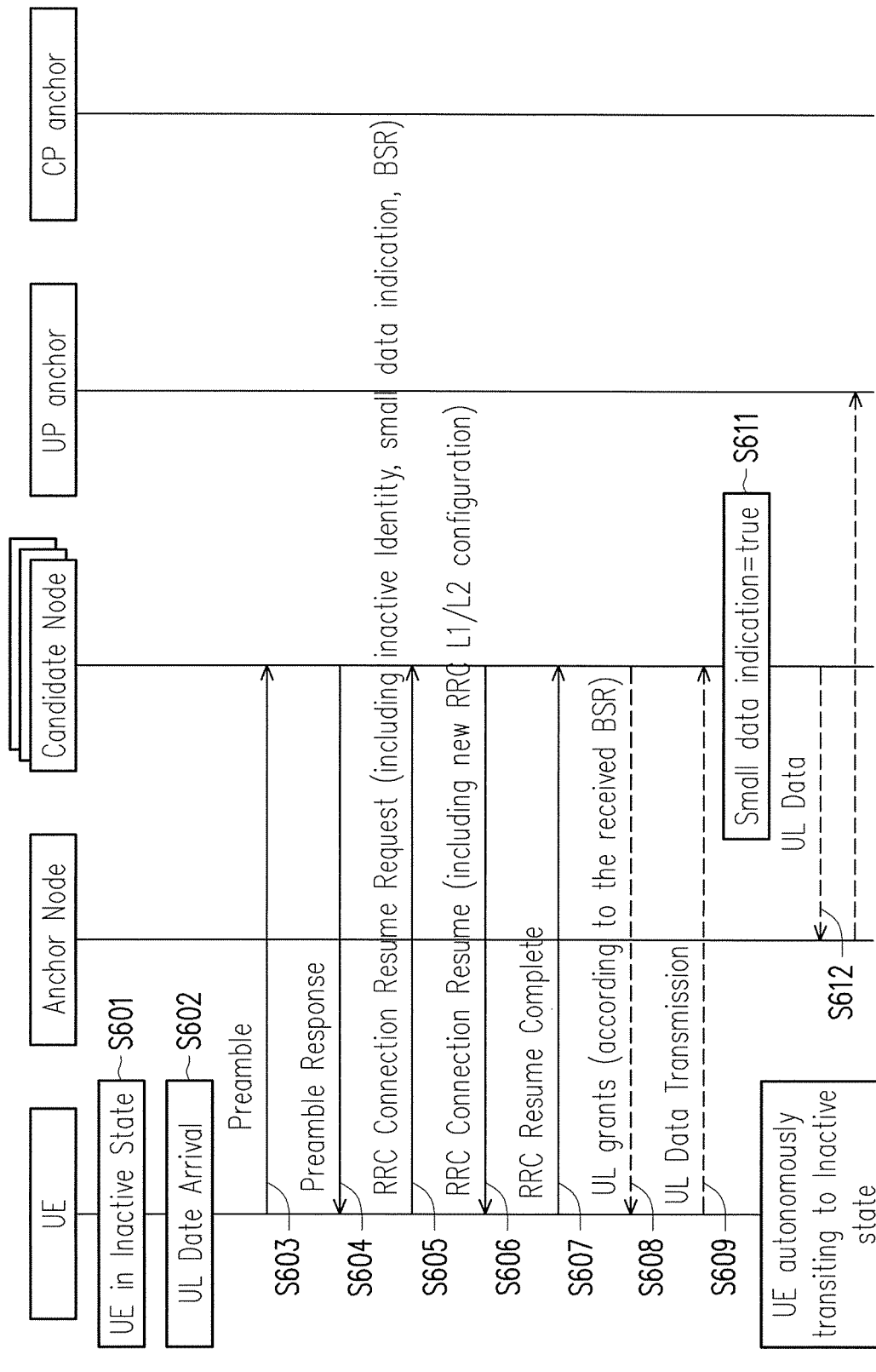
FIG. 6 illustrates a UE switching from an inactive state to a connected state with BSR and without preserved RRC/L2/L1 configuration in accordance with another one of the exemplary embodiments of the disclosure.

FIG. 6 illustrates a UE switching from an inactive state to a connected state with BSR and without preserved RRC/L2/L1 configuration in accordance with another one of the exemplary embodiments of the disclosure. In step S601, the UE is assumed to be in the inactive state. In step S602, for a UE in the inactive state, when the UE has an uplink (UL) data to be transmitted, the UE would perform a RRC Connection Resume procedure for the UL data transmission. In step S603, the UE would transmit a Preamble to a connecting node which could be a Candidate node or an Anchor node. Assuming that the connecting node is a Candidate node, in step S604, the UE may receive a Preamble Response from the Candidate node.

In step S605, the UE would transmit a RRC Connection Resume Request to request a suspended RRC connection to resume. The suspended RRC connection would be associated with the UE in the inactive state. The RRC Connection Resume Request may include an inactive identity such that the connecting node could match its AS context and/or RRC configuration. The RRC Connection Resume Request may also include a small data indication. Based on the setting of the small data indication, the UE may follow the network criteria provided in the previously received inactive state command or provided in the broadcasting information. The setting of the small data indication may also rely on UE implementation. The RRC Connection Resume Request may also contain a BSR to indicate the size of the UL data to be transmitted. In another exemplary embodiment, the RRC Connection Resume Request may further contain a mobility state. The setting of the mobility state may follow the network criteria provided in the previously received inactive state command or provided in the broadcasting information. Under such exemplary embodiment, the setting of the small data indication may also rely on UE implementation.

In step S606, the UE would receive RRC Resume from the Candidate Node to resume the suspended RRC connection. The RRC Connection Resume may contain RRC configuration such as dedicated radio resource configuration, L2 configuration, L1 configuration, or information for ciphering. In response to receiving the RRC Connection Resume, in step S607, the UE would transmit RRC Resume Complete to the Candidate node. In step S608, the Candidate node would transmit UL grants to the UE according to the received BSR. In step S609, the UE would transmit the UL data upon the RRC connection is resumed. In step S610, after successfully transmitting the UL data, the UE would automatically switch to the inactive state if the small data indication indicates true. In response to receiving the UL data, if the received small data indication indicates true, in step S611, the Candidate node would not perform the path update procedure. Instead, the Candidate node would in step S612 forward the UL data to the Anchor node of the UE via an inter-base station interface (e.g. 2534) between connecting nodes. Back in step S611, if the received small data indication, the Candidate node would implicitly know that the UE has switched back to the inactive state, and thus no additional signaling is required to order the UE to make this switch.

Figure 7:
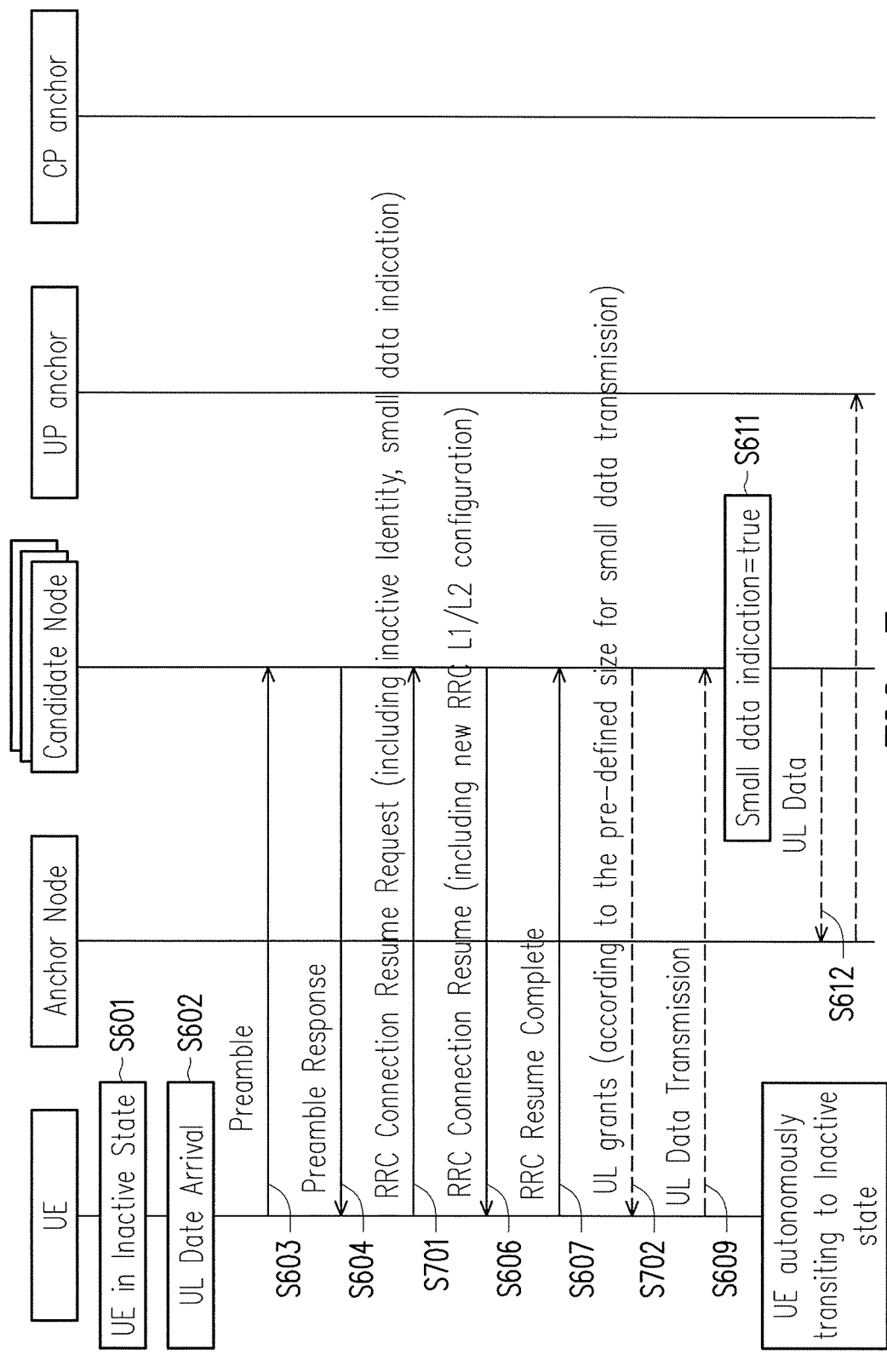
FIG. 7 illustrates a UE switching from an inactive state to a connected state without BSR and without preserved RRC/L2/L1 configuration in accordance with another one of the exemplary embodiments of the disclosure.

FIG. 7 illustrates a UE switching from an inactive state to a connected state without BSR and without preserved RRC/L2/L1 configuration in accordance with another one of the exemplary embodiments of the disclosure. This exemplary embodiment is the same as the exemplary embodiment of FIG. 6 except as follows. In step S701, the UE would transmit the RRC Connection Resume Request to request for the suspended RRC connection, but the RRC Connection Resume Request does not contain the BSR that indicates the size of UL data to be transmitted if the small data indication indicates true. The connecting node such as the Candidate node may provide UL grants according to a predefined size for small data transmission.

Figure 8:
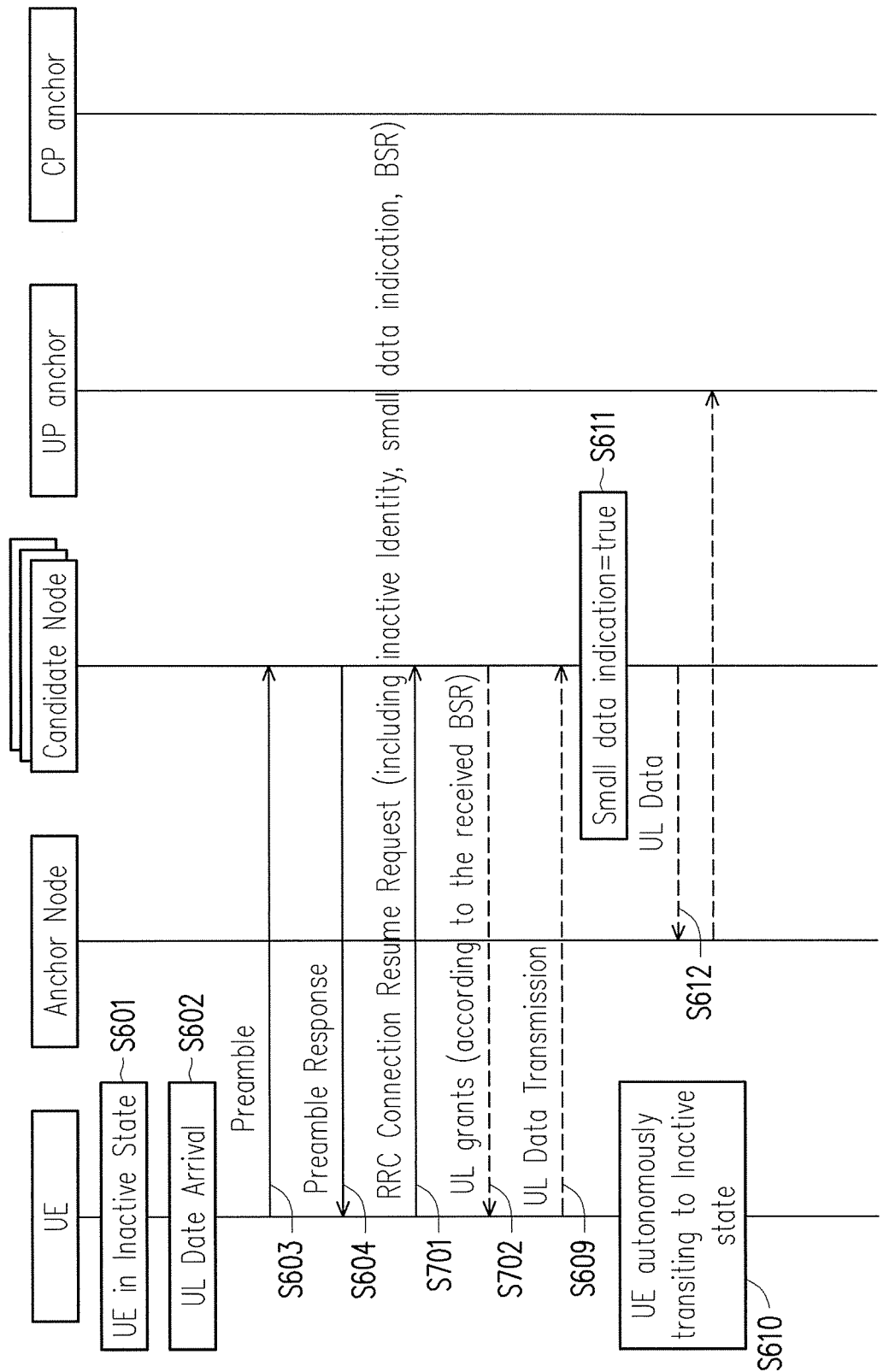
FIG. 8 illustrates a UE switching from an inactive state to a connected state with BSR and preserved RRC/L2/L1 configuration in accordance with another one of the exemplary embodiments of the disclosure.

FIG. 8 illustrates a UE switching from an inactive state to a connected state with BSR and preserved RRC/L2/L1 configuration in accordance with another one of the exemplary embodiments of the disclosure. This exemplary embodiment is the same as the exemplary embodiment of FIG. 6 except as follows. For this exemplary embodiment, the UE already have received the inactive state command to enter the inactive state, and the inactive state command would contain an command or an indicator such as by using the parameter "storing current configuration=yes" to preserve the RRC/L2/L1 configurations. The UE may preserve the RRC/L2/L1 configurations according to a predefined UE behavior. Since both connecting nodes (i.e. Anchor node and Candidate node) and the UE already have the same RRC/L2/L1 configurations for the UE, the messages including RRC Connection Resume (e.g. S606) and RRC Resume Complete (e.g. S607) could be skipped so as to reduce signaling overhead.

Figure 9:
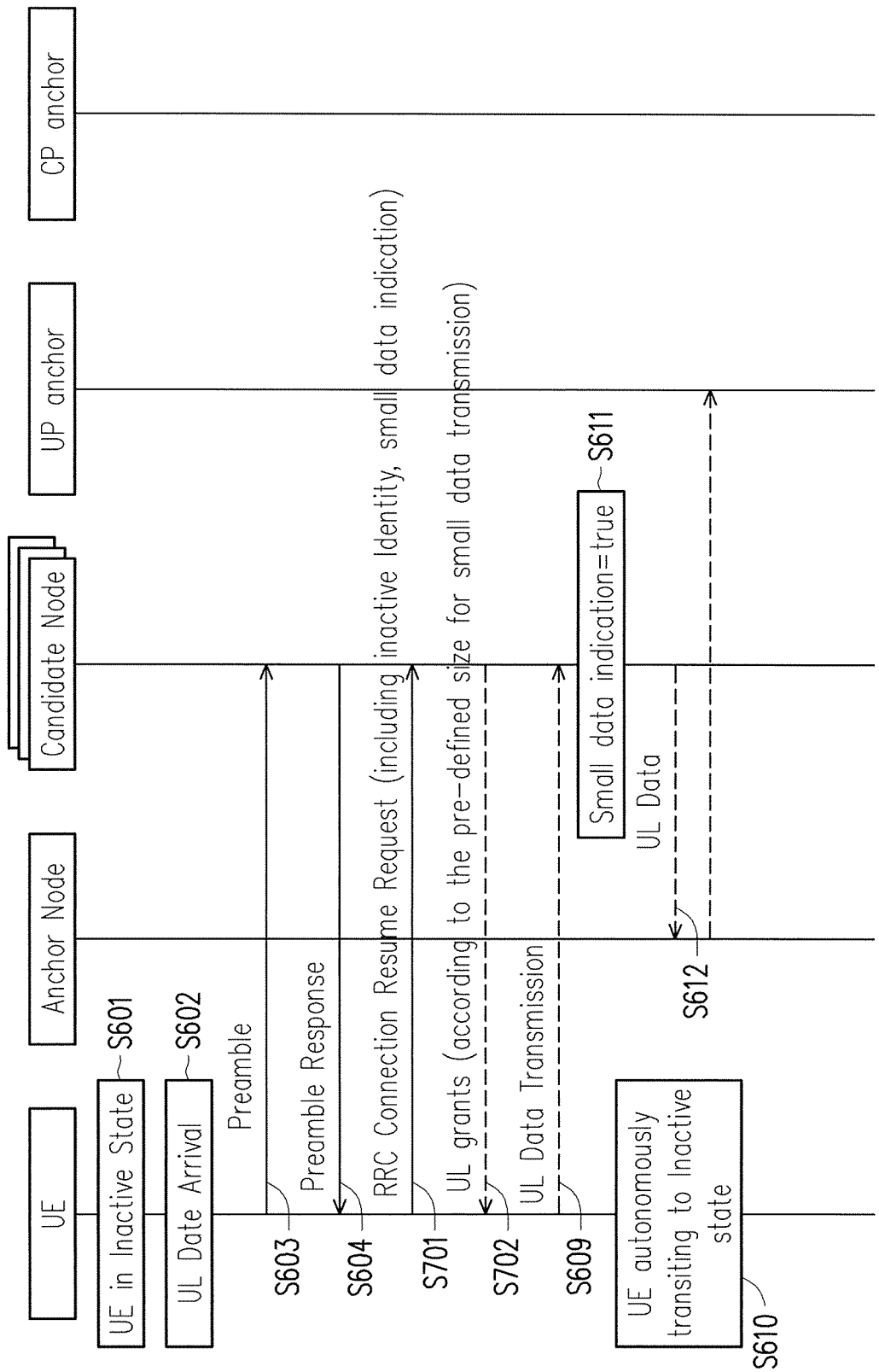
FIG. 9 illustrates a UE switching from an inactive state to a connected state without BSR and with preserved RRC/L2/L1 configuration in accordance with another one of the exemplary embodiments of the disclosure.

FIG. 9 illustrates a UE switching from an inactive state to a connected state without BSR and with preserved RRC/L2/L1 configuration in accordance with another one of the exemplary embodiments of the disclosure. This exemplary embodiment is the same as the exemplary embodiment of FIG. 6 except as follows. The UE in step S901 would transmit the RRC Connection Resume Request to the Candidate node to request for a suspended RRC connection to resume, but the RRC Connection Resume Request does not contain BSR to indicate the size of UL data to be transmitted if the small data indication is true, and the Candidate Node may provide UL grants according to a predefined size for small data transmission.

Figure 10:
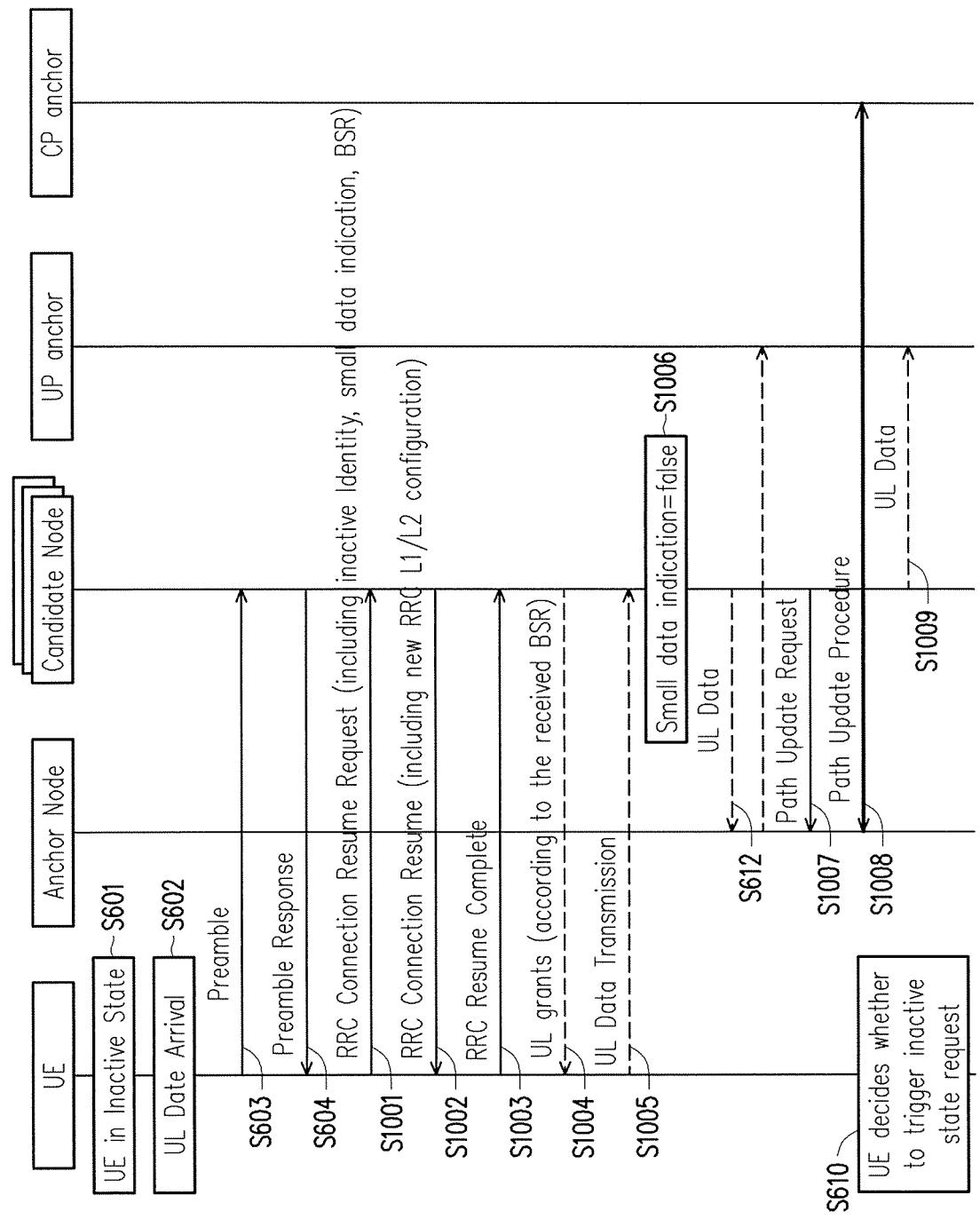
FIG. 10 illustrates a UE switching from an inactive state to a connected state with BSR, with small data indication=false, and without preserved RRC/L2/L1 configuration in accordance with another one of the exemplary embodiments of the disclosure.

FIG. 10 illustrates a UE switching from an inactive state to a connected state with BSR, with small data indication=false, and without preserved RRC/L2/L1 configuration in accordance with another one of the exemplary embodiments of the disclosure. For this exemplary embodiment, the UE is assumed to be in the inactive state. While the UE is in the inactive state and has UL data to transmit, the UE may perform a RRC Connection Resume procedure for transmitting UL data. The UE would transmit a preamble and receive a preamble response from a connecting node which the UE would attempt to connect to. The connecting node which the UE attempts to connect to is assumed to be a Candidate node.

In step S1001, the UE would transmit to the Candidate node a RRC Connection Resume Request to request for the previously suspended RRC connection of the UE to resume. The RRC Connection Resume Request would include the inactive identity such that the Candidate node would be able to match its AS context and/or RRC configuration. The RRC Connection Resume Request may further include a small data indication. The setting of the small data indication may follow the network criteria provided in the previously received inactive state command or provided in the broadcasting information. The setting of the small data indication may rely on UE implementation. The RRC Connection Resume Request may further contain a BSR to indicate the size of UL data to be transmitted. Alternatively, the RRC Connection Resume Request may also further contain a mobility state. The setting of the mobility state may follow the network criteria provided in the previously received inactive state command or provided in the broadcasting information. The setting of small data indication may rely on UE implementation.

In step S1002, the Candidate node would transmit RRC Connection Resume to resume the suspended RRC connection. The RRC Connection Resume would contain a new RRC connection such as dedicated radio resource configuration, a new L2 configuration, a new L1 configuration, or new information for ciphering. After receiving the RRC Connection Resume, in step S1003, the UE would transmit RRC Resume Complete to the Candidate node. In step S1004, the Candidate node would transmit UL grants to the UE according to the received BSR. In step S1005, the UE would transmit the UL data after the RRC connection has been resumed. After successfully transmitting the UL data, the UE may automatically switch to the inactive state if the small data indication indicates false.

If the small data indication indicates false, in step S1006, the Candidate node may perform a path update procedure (S1008) which would include transmitting a Path Update Request as shown in step S1007 to notify the Anchor node to initiate the path update procedure or to initiate the path update procedure by itself. However, before the path update procedure (S1008) is completed, the Candidate node may forward the UL data to the Anchor node of the UE through an inter-base station interface (e.g. 2534) between these two nodes. Afterwards, in step S1010, the UE would determine whether to trigger the inactive state request or not.

For the exemplary embodiment of FIG. 10, a connecting node may need to notify another connection node by a signaling message such as the Path Update Request in order for the Candidate node to let the Anchor node know that the inactive ID is no longer required due to the Anchor node having been changed from the original Anchor node to the current connecting node of the UE. Once the original anchor node receives the notification of the change of the Anchor node, the original node may remove the preserved information such as RRC/L2/L1 configuration associated with the inactive ID and may also inform other connecting nodes to remove such preserved information.

For an alternative embodiment, after performing the path update procedure, the connecting node may notify the new Anchor node ID for the UE for the purpose of using the new inactive identity.

Figure 11:
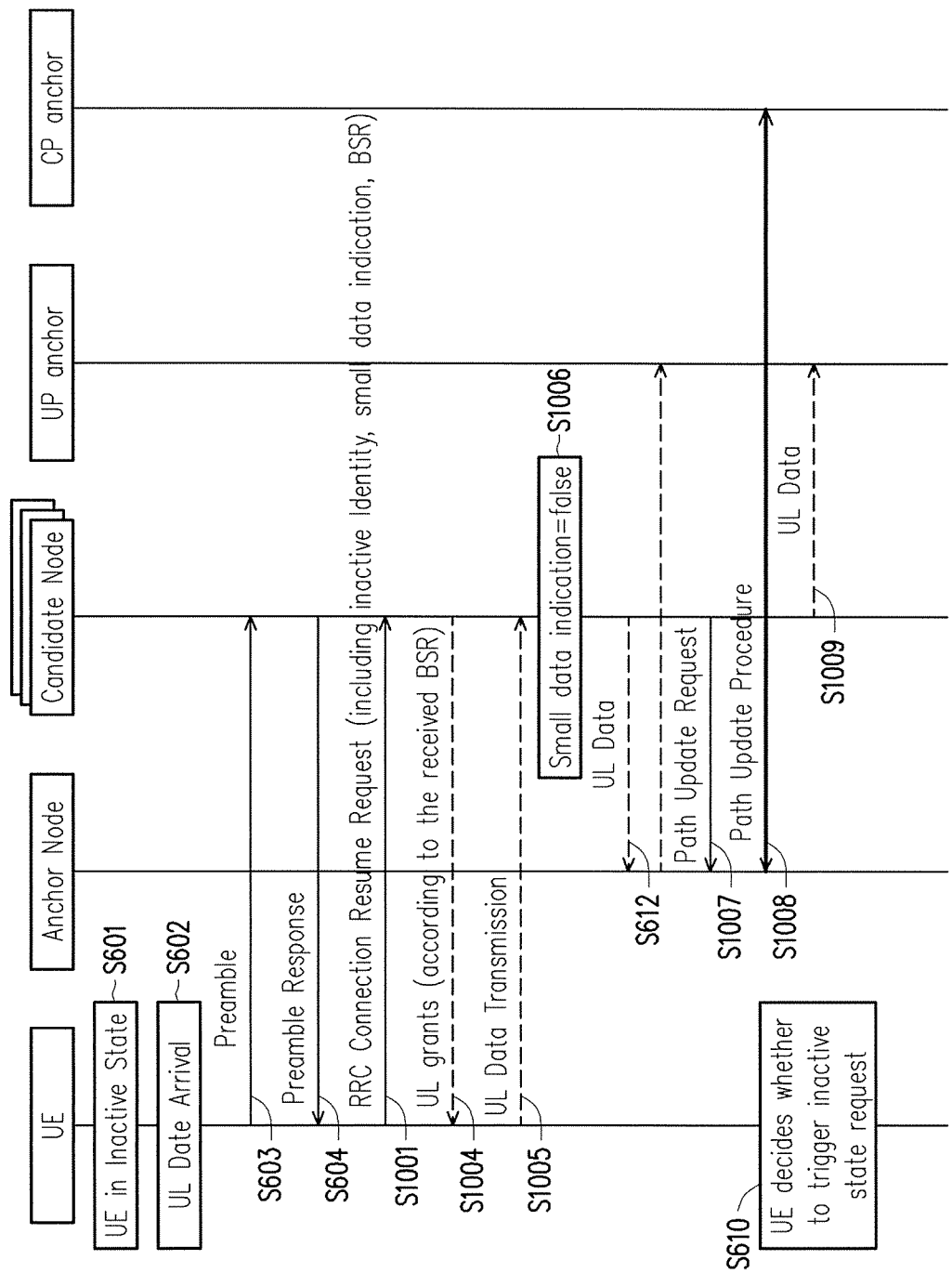
FIG. 11 illustrates a UE switching from an inactive state to a connected state with BSR, with small data indication=false, and with preserved RRC/L2/L1 configuration in accordance with another one of the exemplary embodiments of the disclosure.

FIG. 11 illustrates a UE switching from an inactive state to a connected state with BSR, with small data indication=false, and with preserved RRC/L2/L1 configuration in accordance with another one of the exemplary embodiments of the disclosure. This exemplary embodiment is the same as the exemplary embodiment of FIG. 10 except as follows. The UE may already have received the inactive state command to enter the inactive state, and the inactive state command would contain a command or an indicator such as by using the parameter "storing current configuration=yes" to preserve the RRC/L2/L1 configurations. The UE may preserve the RRC/L2/L1 configurations according to a predefined UE behavior. Since both connecting nodes (i.e. Anchor node and Candidate node) and the UE already have the same RRC/L2/L1 configurations for the UE, the messages including RRC Connection Resume (e.g. S1002) and RRC Resume Complete (e.g. S1003) could be skipped so as to reduce signaling overhead.

Figure 12:
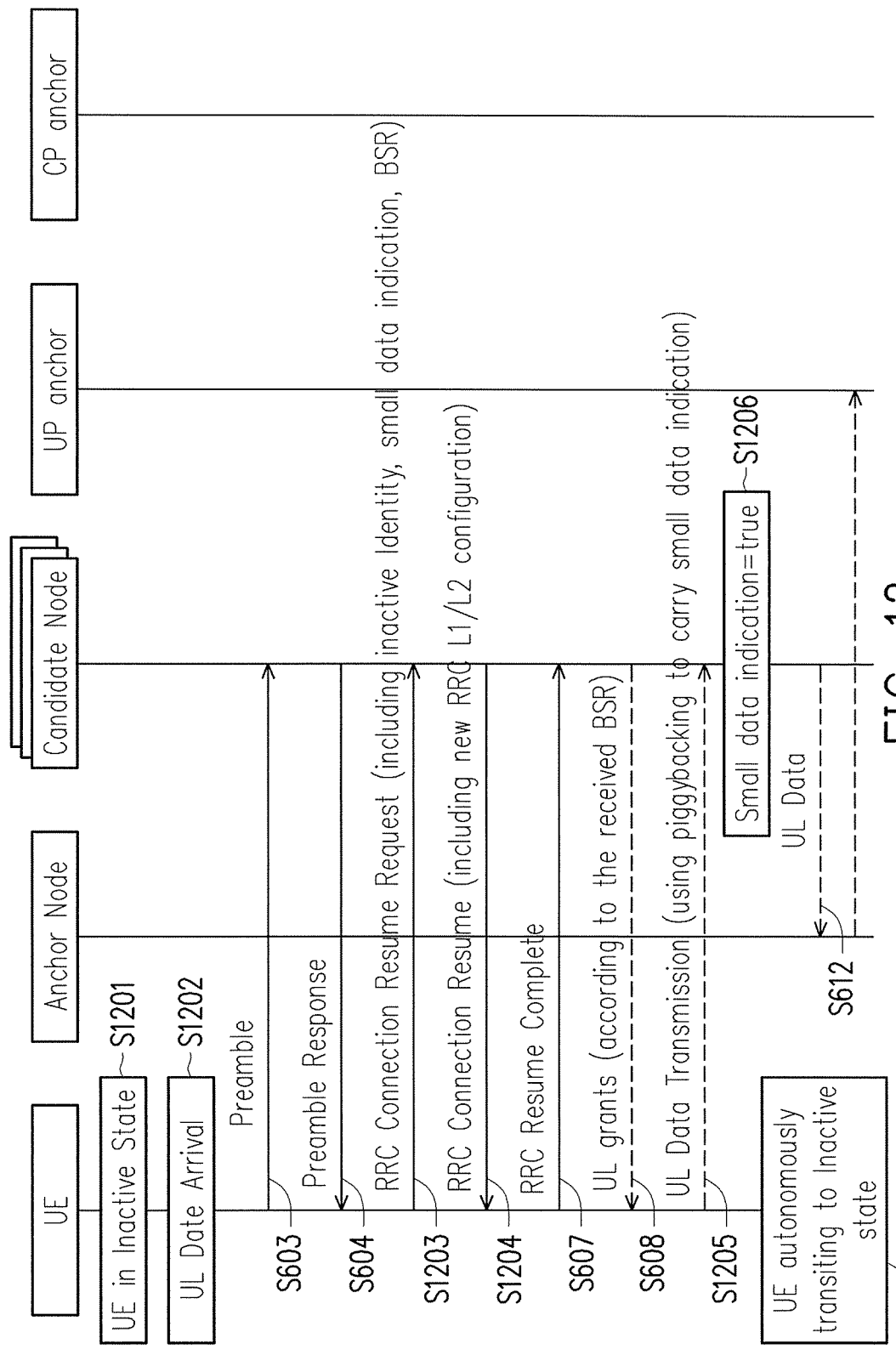
FIG. 12 illustrates a UE switching from an inactive state to a connected state with small data indication=true and without preserved RRC/L2/L1 configuration in accordance with another one of the exemplary embodiments of the disclosure.

FIG. 12 illustrates a UE switching from an inactive state to a connected state with small data indication=true and without preserved RRC/L2/L1 configuration in accordance with another one of the exemplary embodiments of the disclosure. For this exemplary embodiment, the UE is assumed to be in the inactive state. While the UE is in the inactive state and has UL data to transmit, the UE may perform a RRC Connection Resume procedure for transmitting UL data. The UE would transmit a preamble and receive a preamble response from a connecting node which the UE would attempt to connect to. The connecting node which the UE attempts to connect to is assumed to be a Candidate node.

In step S1203, the UE would transmit to the Candidate node a RRC Connection Resume Request to request for the previously suspended RRC connection of the UE to resume. The RRC Connection Resume Request would include the inactive identity such that the Candidate node would be able to match its AS context and/or RRC configuration. The RRC Connection Resume Request may further contain a BSR to indicate the size of UL data to be transmitted. In step S1204, the Candidate node would transmit RRC Connection Resume to resume the suspended RRC connection. The RRC Connection Resume would contain a new RRC connection such as dedicated radio resource configuration, a new L2 configuration, a new L1 configuration, or new information for ciphering. After receiving the RRC Connection Resume, the UE would transmit RRC Resume Complete to the Candidate node. Next, the Candidate node would transmit UL grants to the UE according to the received BSR.

In step S1205, the UE would transmit the UL data after the RRC connection has been resumed. The small data indication could be carried along or embedded within the UL data. The setting of the small data indication may follow the network criteria provided in the previously received inactive state command or provided in the broadcasting information. The setting of the small data indication may rely on UE implementation. Alternatively, the mobility state could also be carried along or embedded within the UL data. The setting of the mobility state may follow the network criteria provided in the previously received inactive state command or provided in the broadcasting information. The setting of small data indication may rely on UE implementation.

After successfully transmitting the UL data, in step S1207 the UE may automatically switch to the inactive state if the small data indication indicates false. If the small data indication indicates false, in step S1206, the Candidate node may not perform a path update but would deliver the UL data to the Anchor node of the UE via the inter-base station interface (e.g. 2534) between connecting nodes. If the received small data indication indicates true, the Candidate node would implicitly know that the UE would switch back to the inactive state without requiring additional signaling to order the UE to do so.

Figure 13:
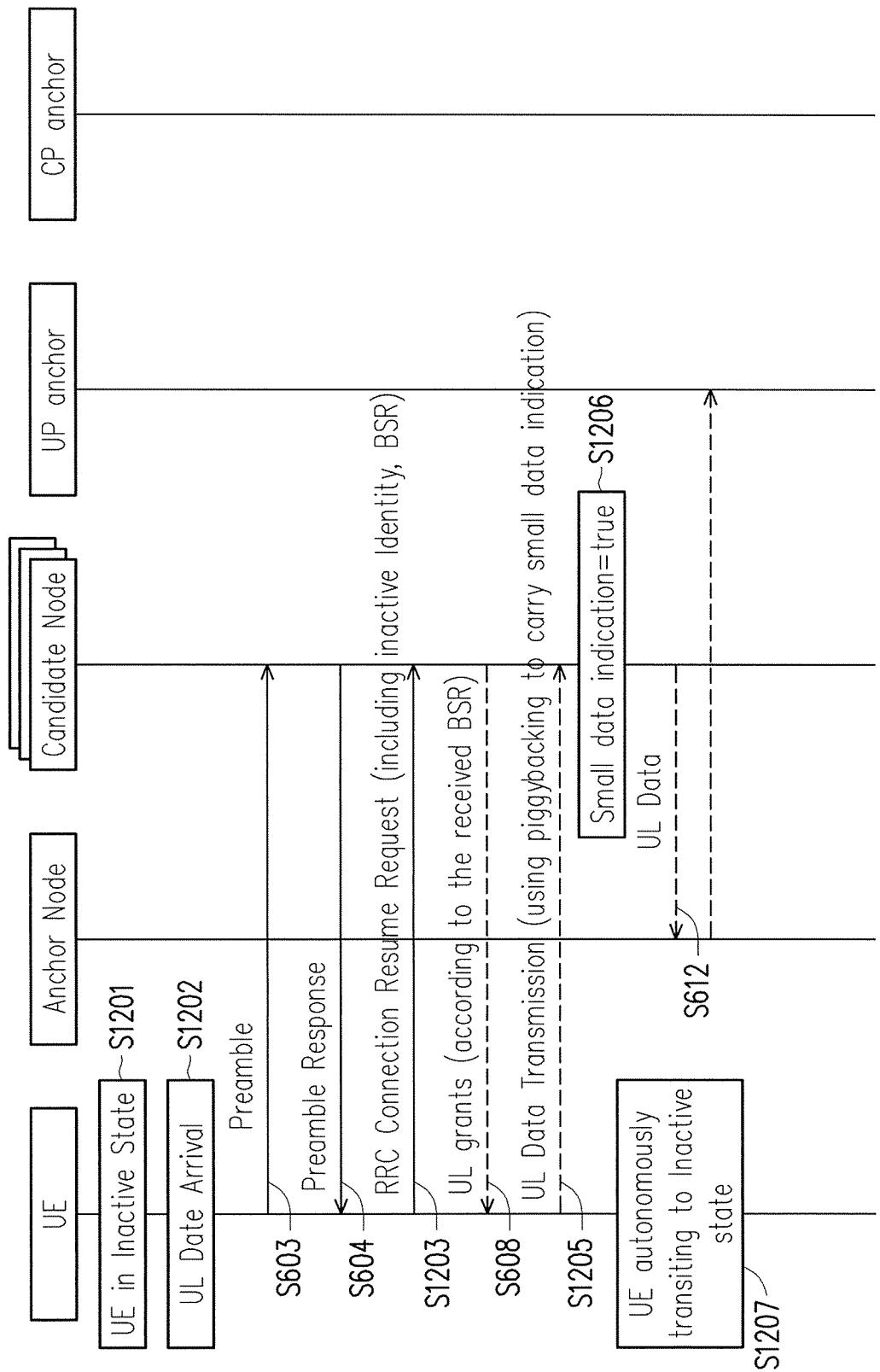
FIG. 13 illustrates a UE switching from an inactive state to a connected state with small data indication=true and with preserved RRC/L2/L1 configuration in accordance with another one of the exemplary embodiments of the disclosure.

FIG. 13 illustrates a UE switching from an inactive state to a connected state with small data indication=true and with preserved RRC/L2/L1 configuration in accordance with another one of the exemplary embodiments of the disclosure. This exemplary embodiment is the same as the exemplary embodiment of FIG. 12 except as follows. The UE may already have received the inactive state command to enter the inactive state, and the inactive state command would contain a command or an indicator such as by using the parameter "storing current configuration=yes" to preserve the RRC/L2/L1 configurations. The UE may preserve the RRC/L2/L1 configurations according to a predefined UE behavior. Since both connecting nodes (i.e. Anchor node and Candidate node) and the UE already have the same RRC/L2/L1 configurations for the UE, the messages including RRC Connection Resume (e.g. S1204) and RRC Resume Complete could be skipped so as to reduce signaling overhead.

Figure 14:
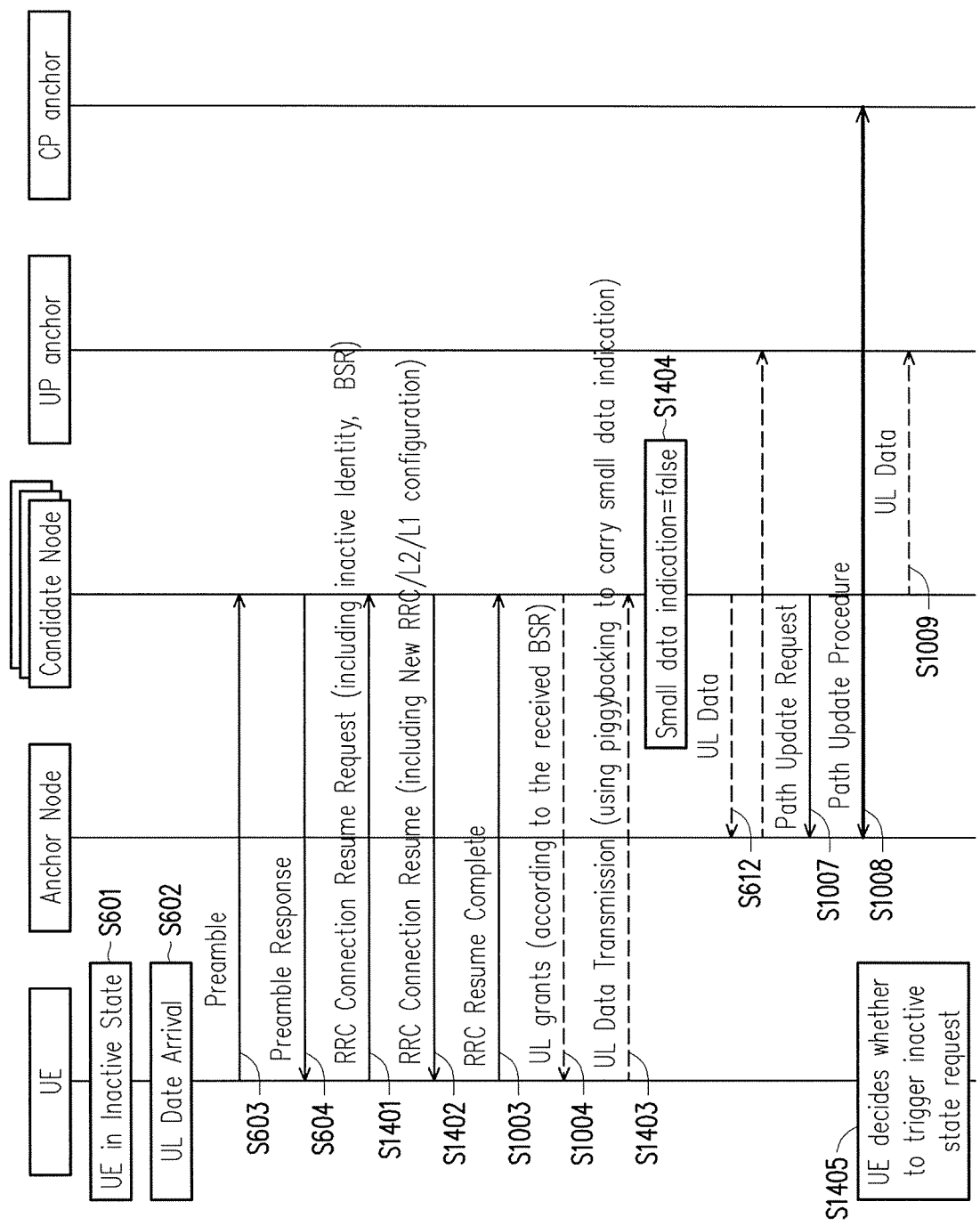
FIG. 14 illustrates a UE switching from an inactive state to a connected state with small data indication=false and without preserved RRC/L2/L1 configuration in accordance with another one of the exemplary embodiments of the disclosure.

FIG. 14 illustrates a UE switching from an inactive state to a connected state with small data indication=false and without preserved RRC/L2/L1 configuration in accordance with another one of the exemplary embodiments of the disclosure. For this exemplary embodiment, the UE is assumed to be in the inactive state. While the UE is in the inactive state and has UL data to transmit, the UE may perform a RRC Connection Resume procedure for transmitting UL data. The UE would transmit a preamble and receive a preamble response from a connecting node which the UE would attempt to connect to. The connecting node which the UE attempts to connect to is assumed to be a Candidate node.

In step S1401, the UE would transmit to the Candidate node a RRC Connection Resume Request to request for the previously suspended RRC connection of the UE to resume. The RRC Connection Resume Request would include the inactive identity such that the Candidate node would be able to match its AS context and/or RRC configuration. The RRC Connection Resume Request may further contain a BSR to indicate the size of UL data to be transmitted. In step S1402, the Candidate node would transmit RRC Connection Resume to resume the suspended RRC connection. The RRC Connection Resume would contain a new RRC connection such as dedicated radio resource configuration, a new L2 configuration, a new L1 configuration, or new information for ciphering. After receiving the RRC Connection Resume, the UE would transmit RRC Resume Complete to the Candidate node. Next, the Candidate node would transmit UL grants to the UE according to the received BSR.

In step S1403, the UE would transmit the UL data after the RRC connection has been resumed. The small data indication could be carried along or embedded within the UL data. The setting of the small data indication may follow the network criteria provided in the previously received inactive state command or provided in the broadcasting information. The setting of the small data indication may rely on UE implementation. Alternatively, the mobility state could also be carried along or embedded within the UL data. The setting of the mobility state may follow the network criteria provided in the previously received inactive state command or provided in the broadcasting information. The setting of small data indication may rely on UE implementation.

After successfully transmitting the UL data, the UE may automatically switch to the inactive state if the small data indication indicates false. If the small data indication indicates false, in step S1404, the Candidate node may perform a path update procedure. However, before the path update procedure is complete, the Candidate node may forward the UL data to the Anchor node of the UE via an inter-base station interface (e.g. 2534) between these two connecting nodes. In step S1405, the UE would determine whether to trigger the inactive state request or not. Alternatively, after performing the path update procedure, the connecting node may notify the new Anchor node ID for the UE for the usage of a new inactive Identity.

Figure 15:
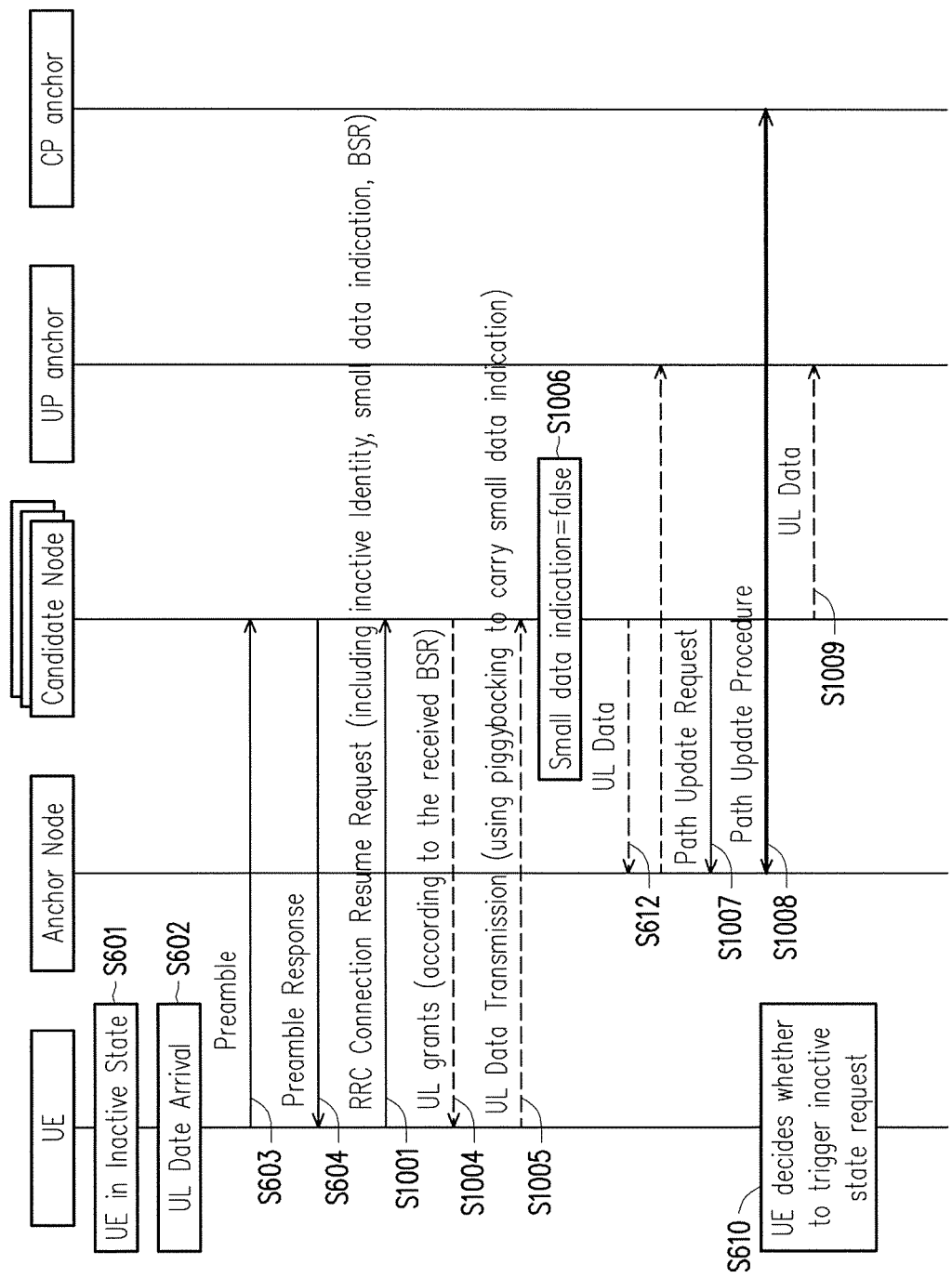
FIG. 15 illustrates a UE switching from an inactive state to a connected state with small data indication=false and with preserved RRC/L2/L1 configuration in accordance with another one of the exemplary embodiments of the disclosure.

FIG. 15 illustrates a UE switching from an inactive state to a connected state with small data indication=false and with preserved RRC/L2/L1 configuration in accordance with another one of the exemplary embodiments of the disclosure. This exemplary embodiment is the same as the exemplary embodiment of FIG. 14 except as follows. The UE may already have received the inactive state command to enter the inactive state, and the inactive state command would contain a command or an indicator such as by using the parameter "storing current configuration=yes" to preserve the RRC/L2/L1 configurations. The UE may preserve the RRC/L2/L1 configurations according to a predefined UE behavior. Since both connecting nodes (i.e. Anchor node and Candidate node) and the UE already have the same RRC/L2/L1 configurations for the UE, the messages including RRC Connection Resume (e.g. S1402) and RRC Resume Complete could be skipped so as to reduce signaling overhead.

Figure 16:
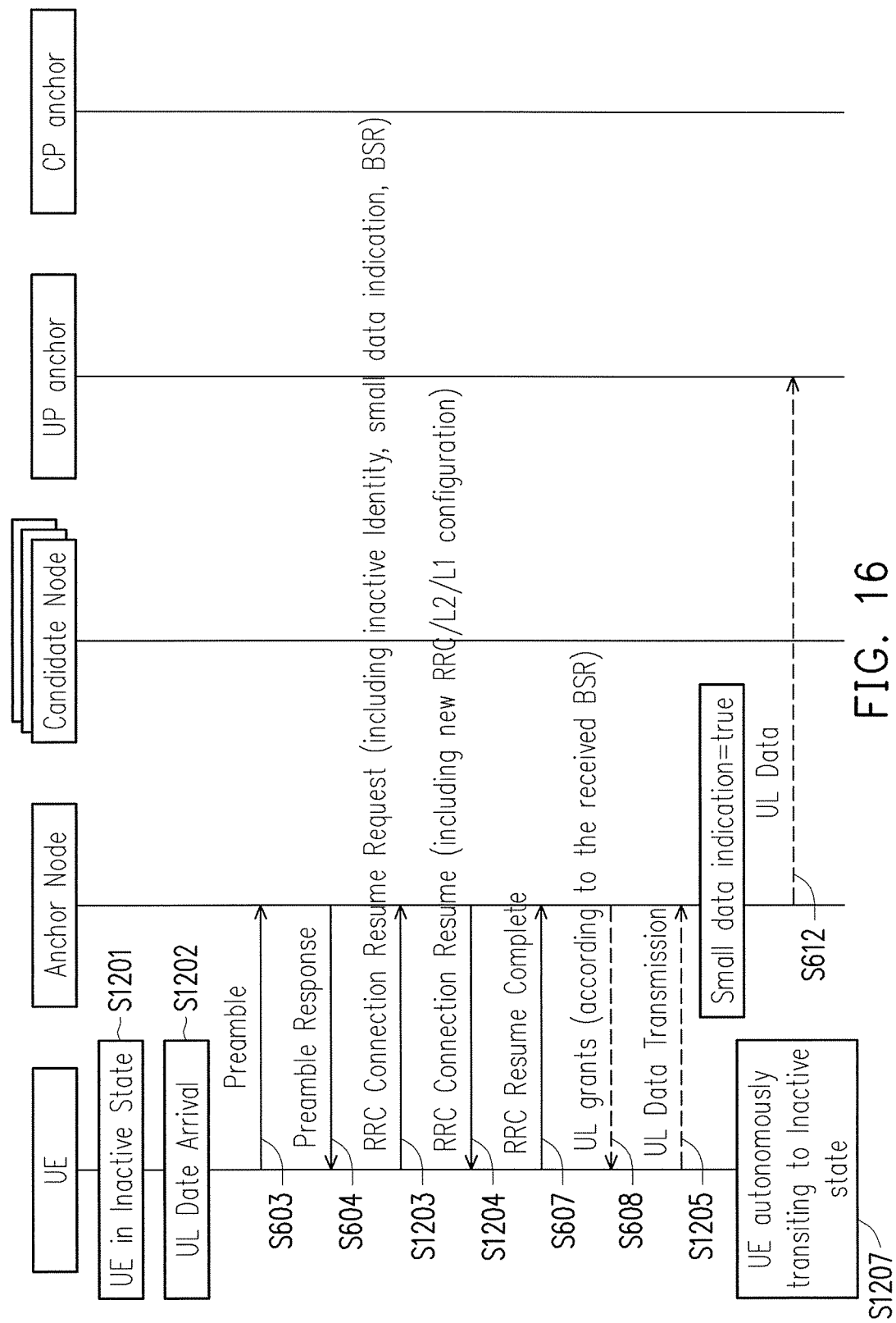
FIG. 16 illustrates a UE switching from an inactive state to a connected state with small data indication=true, with BSR, and without preserved RRC/L2/L1 configuration in accordance with another one of the exemplary embodiments of the disclosure.

FIG. 16 illustrates a UE switching from an inactive state to a connected state with small data indication=true, with BSR, and without preserved RRC/L2/L1 configuration in accordance with another one of the exemplary embodiments of the disclosure. This exemplary embodiment is the same as the exemplary embodiment of FIG. 6 but the connecting node for the UE is Anchor node instead of the Candidate node. In FIG. 16, the UE is assumed to be in the inactive state. While a UE in the inactive state, when the UE has an uplink (UL) data to be transmitted, the UE would perform a RRC Connection Resume procedure for the UL data transmission. Next, the UE would transmit a Preamble to an Anchor node and subsequently receive a Preamble Response from the Anchor node.

Next, the UE would transmit to an Anchor node a RRC Connection Resume Request to request a suspended RRC connection to resume. The suspended RRC connection would be associated with the UE in the inactive state. The RRC Connection Resume Request may include an inactive identity such that the connecting node could match its AS context and/or RRC configuration. The RRC Connection Resume Request may also include a small data indication. Based on the setting of the small data indication, the UE may follow the network criteria provided in the previously received inactive state command or provided in the broadcasting information. The setting of the small data indication may also rely on UE implementation. The RRC Connection Resume Request may also contain a BSR to indicate the size of the UL data to be transmitted. In another exemplary embodiment, the RRC Connection Resume Request may further contain a mobility state. The setting of the mobility state may follow the network criteria provided in the previously received inactive state command or provided in the broadcasting information. Under such exemplary embodiment, the setting of the small data indication may also rely on UE implementation.

Next, the UE would receive RRC Resume from the Anchor node to resume the suspended RRC connection. The RRC Connection Resume may contain RRC configuration such as dedicated radio resource configuration, L2 configuration, L1 configuration, or information for ciphering. In response to receiving the RRC Connection Resume, the UE would transmit RRC Resume Complete to the Anchor node. In step S608, the Anchor node would transmit UL grants to the UE according to the received BSR. Next, the UE would transmit the UL data upon the RRC connection is resumed. After successfully transmitting the UL data, the UE would automatically switch to the inactive state if the small data indication indicates true. In response to receiving the UL data, if the received small data indication indicates true, the Anchor node would not perform the path update procedure. Next, the Anchor node would forward the UL data to an UP anchor in the CN. If the received small data indication, the Anchor node would implicitly know that the UE has switched back to the inactive state, and thus no additional signaling is required to order the UE to make this switch.

Figure 17:
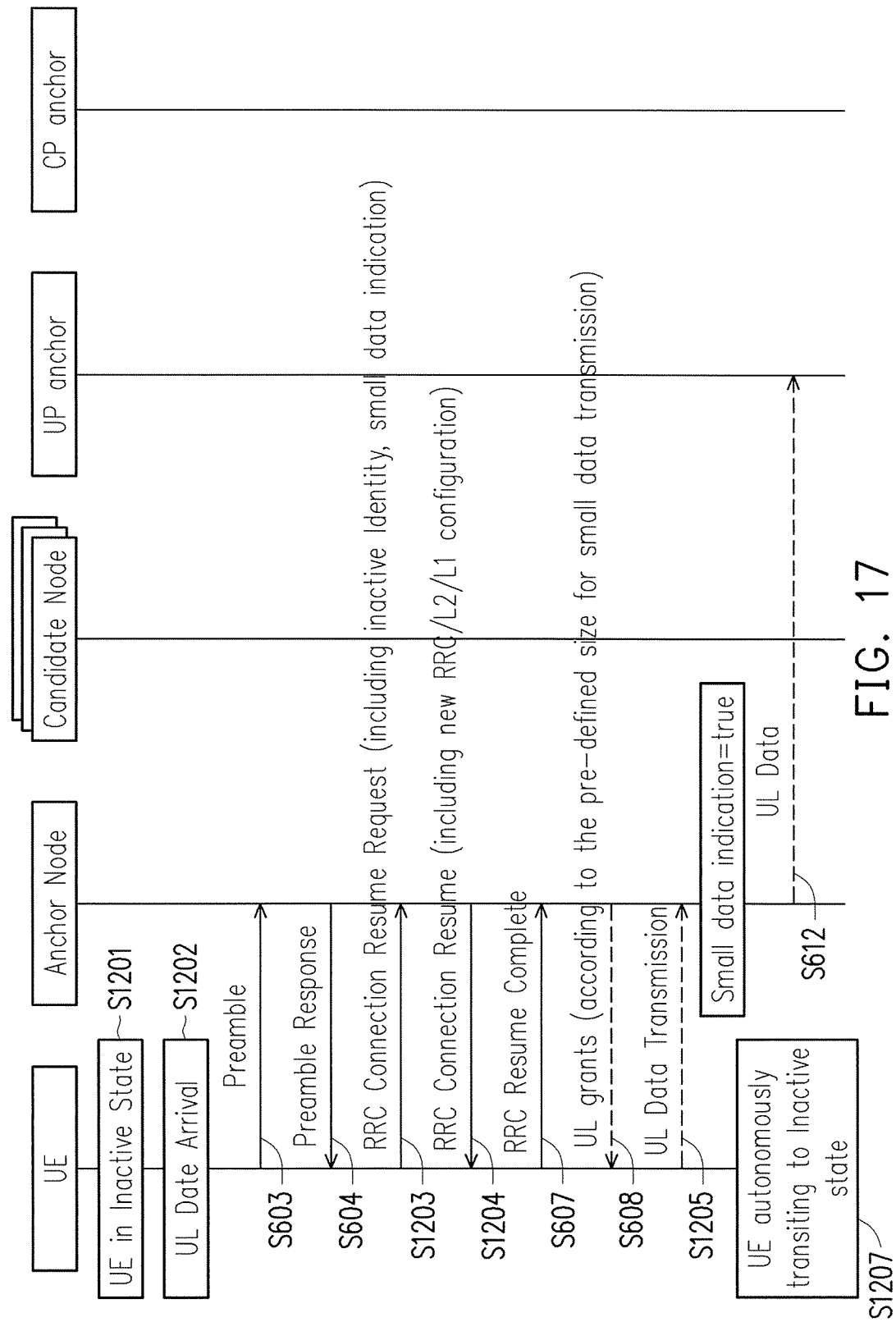
FIG. 17 illustrates a UE switching from an inactive state to a connected state with small data indication=true, without BSR, and without preserved RRC/L2/L1 configuration in accordance with another one of the exemplary embodiments of the disclosure.

FIG. 17 illustrates a UE switching from an inactive state to a connected state with small data indication=true, without BSR, and without preserved RRC/L2/L1 configuration in accordance with another one of the exemplary embodiments of the disclosure. This exemplary embodiment is the same as the exemplary embodiment of FIG. 16 except as follows. For the exemplary embodiment of FIG. 17, the RRC Connection Resume Request transmitted by the UE to request for a previously suspended RRC connection to resume is without any BSR to indicate the size of UL data to be transmitted if the small data indication indicates true. The Anchor node may then provide UL grants to the UE according to a predefined size for small data transmission.

Figure 18:
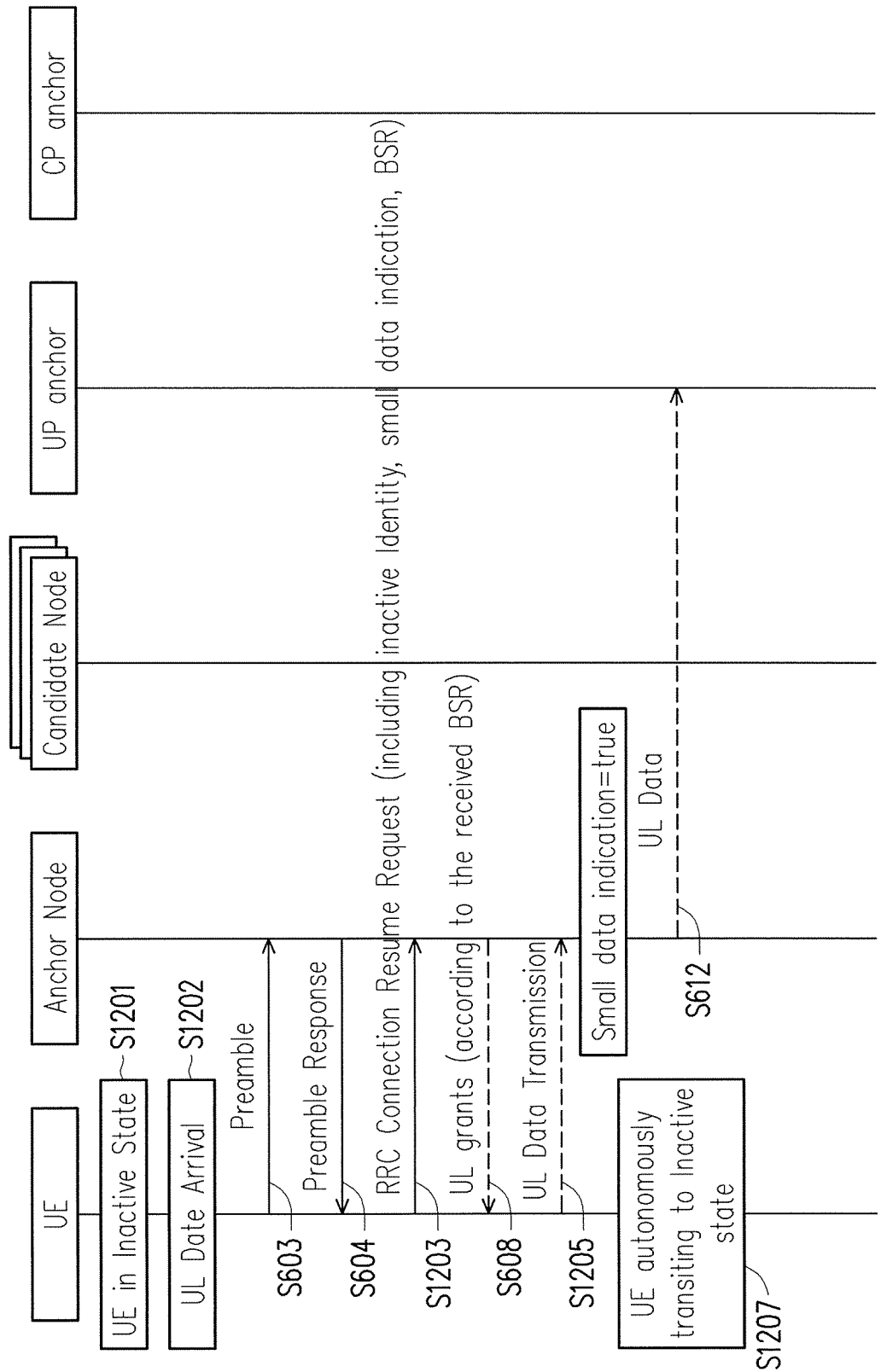
FIG. 18 illustrates a UE switching from an inactive state to a connected state with small data indication=true, with BSR, and with preserved RRC/L2/L1 configuration in accordance with another one of the exemplary embodiments of the disclosure.

FIG. 18 illustrates a UE switching from an inactive state to a connected state with small data indication=true, with BSR, and with preserved RRC/L2/L1 configuration in accordance with another one of the exemplary embodiments of the disclosure. This exemplary embodiment is the same as the exemplary embodiment of FIG. 16 except as follows. For the exemplary embodiment of FIG. 18, the UE may have previously received the inactive state command which indicates that the RRC/L2/L1 configurations are to be preserved by, for example, using the parameter "storing current configuration"=yes. The UE may preserve the RRC/L2/L1 configurations according to the predefined UE behavior. Since both the Anchor node and the Candidate Node and the UE have the same RRC/L2/L1 configurations for the UE, signaling messages including RRC Connection Resume and RRC Resume Complete could be skipped so as to reduce the signaling overhead.

Figure 19:
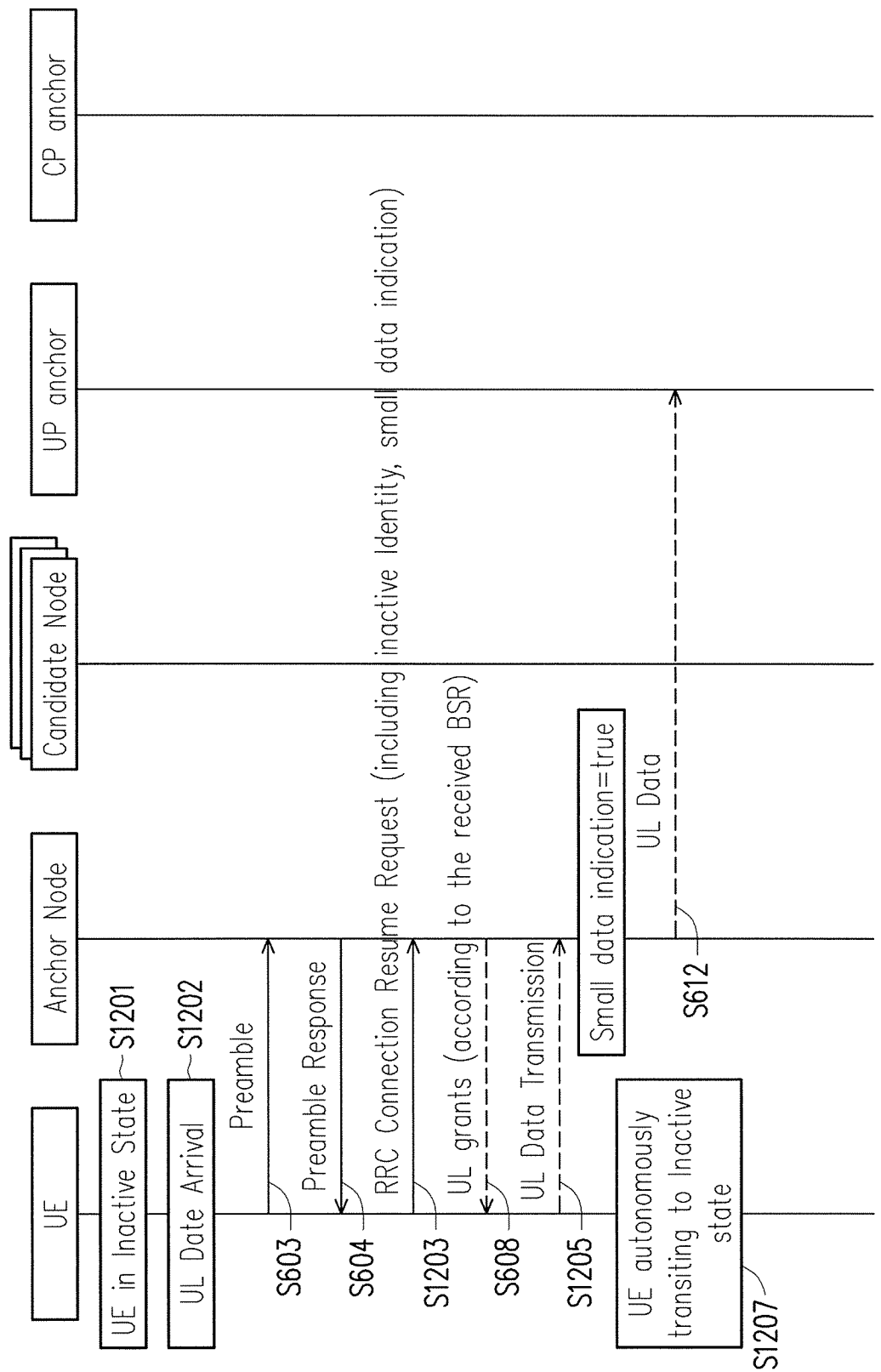
FIG. 19 illustrates a UE switching from an inactive state to a connected state with small data indication=true, without BSR, and with preserved RRC/L2/L1 configuration in accordance with another one of the exemplary embodiments of the disclosure.

FIG. 19 illustrates a UE switching from an inactive state to a connected state with small data indication=true, without BSR, and with preserved RRC/L2/L1 configuration in accordance with another one of the exemplary embodiments of the disclosure. This exemplary embodiment is the same as the exemplary embodiment of FIG. 16 except as follows. For the exemplary embodiment of FIG. 19, the RRC Connection Resume Request transmitted by the UE to request the suspended RRC connection to resume is without any BSR to indicate the size of the UL data to be transmitted if the small data indication indicates true, and the Anchor node may provide UL grants according to the predefined size for small data transmission.

Figure 20:
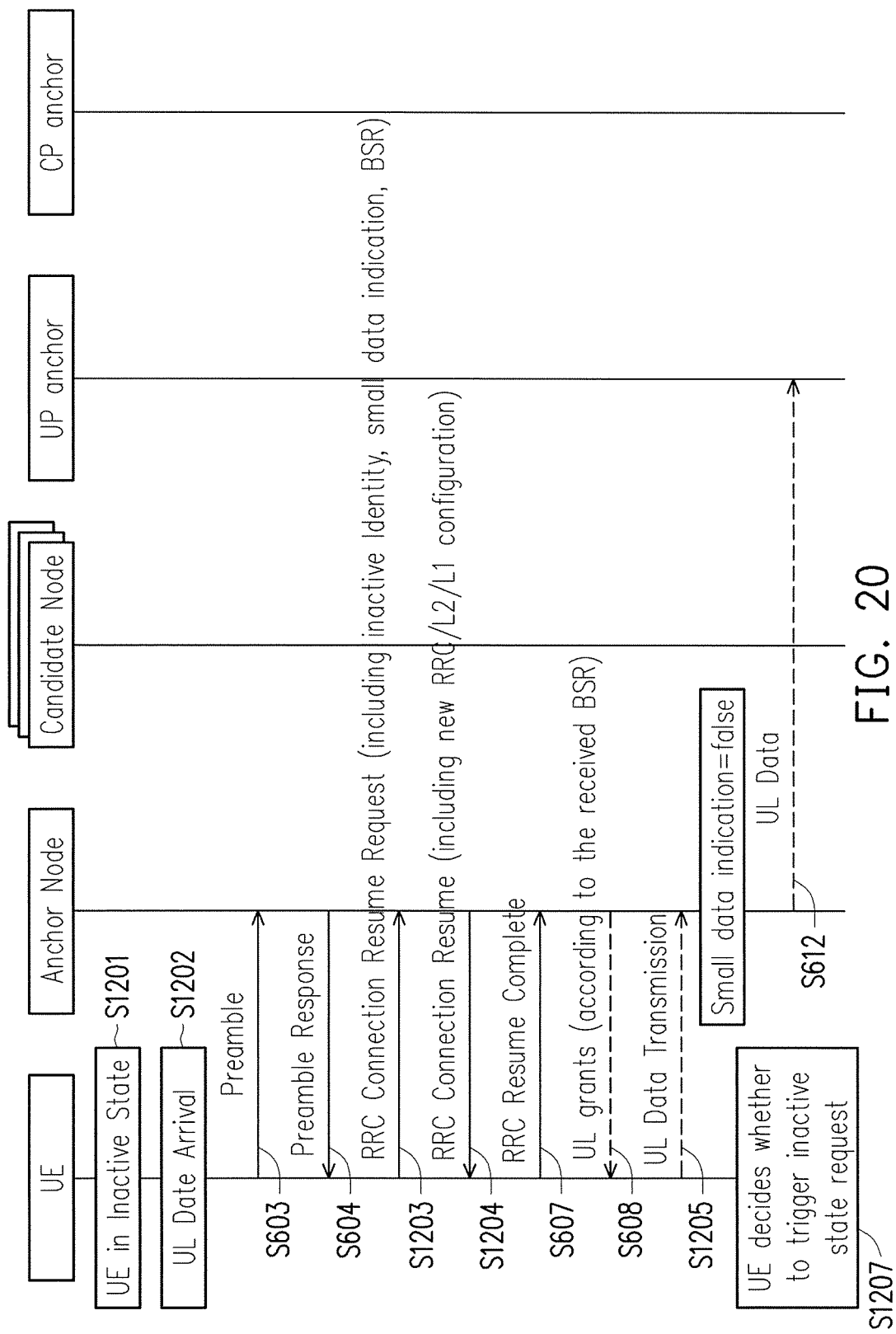
FIG. 20 illustrates a UE switching from an inactive state to a connected state with small data indication=false, with BSR, and without preserved RRC/L2/L1 configuration in accordance with another one of the exemplary embodiments of the disclosure.

FIG. 20 illustrates a UE switching from an inactive state to a connected state with small data indication=false, with BSR, and without preserved RRC/L2/L1 configuration in accordance with another one of the exemplary embodiments of the disclosure. This exemplary embodiment is the same as the exemplary embodiment of FIG. 10 except that the connecting node is an Anchor node instead of a Candidate node. Moreover, since the connecting node is an Anchor node, no path update procedure would be required. For this exemplary embodiment, the UE is assumed to be in the inactive state. While the UE is in the inactive state and has UL data to transmit, the UE may perform a RRC Connection Resume procedure for transmitting UL data. The UE would transmit a preamble and receive a preamble response from an Anchor node which the UE would attempt to connect to.

Next, the UE would transmit to the Anchor node a RRC Connection Resume Request to request for the previously suspended RRC connection of the UE to resume. The RRC Connection Resume Request would include the inactive identity such that the Candidate node would be able to match its AS context and/or RRC configuration. The RRC Connection Resume Request may further include a small data indication. The setting of the small data indication may follow the network criteria provided in the previously received inactive state command or provided in the broadcasting information. The setting of the small data indication may rely on UE implementation. The RRC Connection Resume Request may further contain a BSR to indicate the size of UL data to be transmitted. Alternatively, the RRC Connection Resume Request may also further contain a mobility state. The setting of the mobility state may follow the network criteria provided in the previously received inactive state command or provided in the broadcasting information. The setting of small data indication may rely on UE implementation.

Next, the Anchor node would transmit RRC Connection Resume to resume the suspended RRC connection. The RRC Connection Resume would contain a new RRC connection such as dedicated radio resource configuration, a new L2 configuration, a new L1 configuration, or new information for ciphering. After receiving the RRC Connection Resume, the UE would transmit RRC Resume Complete to the Anchor node. Next, the Anchor node would transmit UL grants to the UE according to the received BSR. Next, the UE would transmit the UL data after the RRC connection has been resumed. After successfully transmitting the UL data, the UE may automatically switch to the inactive state if the small data indication indicates false.

Figure 21:
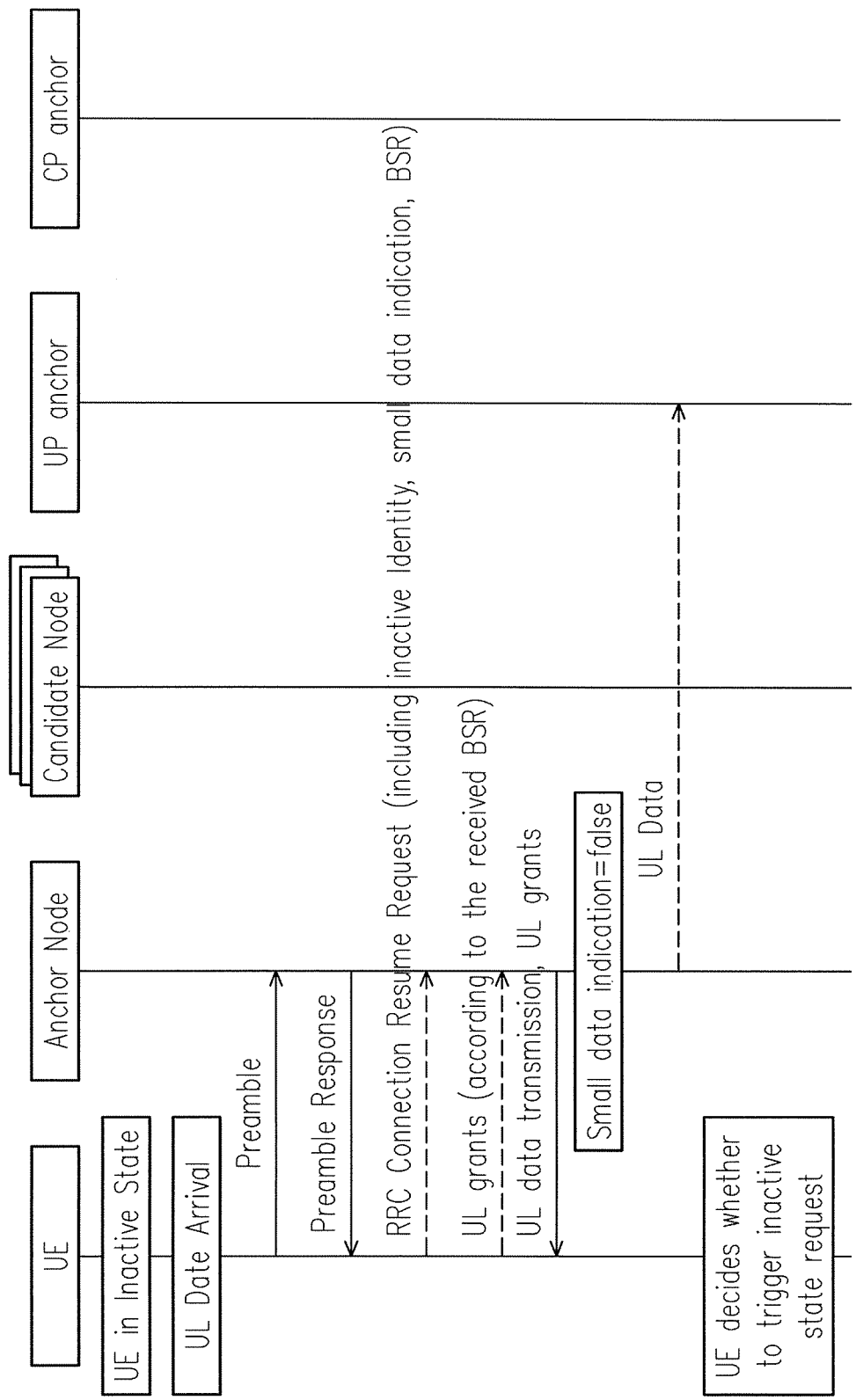
FIG. 21 illustrates a UE switching from an inactive state to a connected state with small data indication=false, with BSR, and with preserved RRC/L2/L1 configuration in accordance with another one of the exemplary embodiments of the disclosure.

FIG. 21 illustrates a UE switching from an inactive state to a connected state with small data indication=false, with BSR, and with preserved RRC/L2/L1 configuration in accordance with another one of the exemplary embodiments of the disclosure. This exemplary embodiment is the same as the exemplary embodiment of FIG. 20 except as follows. For the exemplary embodiment of FIG. 21, the UE may previously have received the inactive state command which indicates the UE to preserve the RRC/L2/L1 configurations by using, for example, the parameter "storing current configuration"=yes. The UE may reserve the RRC/L2/L1 configurations according to the pre-defined UE behavior. Since both the Anchoring node and the UE have the same RRC/L2/L1 configurations for the UE, the signaling messages including RRC Connection Resume and RRC Resume Complete could be skipped so as to reduce the signaling overhead.

In view of the aforementioned descriptions, the present disclosure is suitable for being used in a wireless communication system and is able to implement a transition between the connected state and the inactive state in a way that reduces signaling overhead and power consumption for both the UE and connecting nodes in a network.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A state transitioning method used by a user equipment to switch between a connected state and an inactive state, and the method comprising:
   establishing a wireless connection to enter into a connected state;
   receiving an inactive state command while being in the connected state;
   entering into the inactive state in response to receiving the inactive state command;
   transmitting a connection resume request while being in the inactive state;
   receiving an uplink (UL) grant which corresponds to the connection resume request; and
   transmitting UL data in response to receiving the UL grant,
   wherein the inactive state command is received from a first base station from which the wireless connection has been established, the inactive state command comprising information of a radio access network (RAN) based notification area (RNA), and a network criteria which assists the user equipment to determine whether a small data indication indicates true or false based on the network criteria and determine whether to enter the inactive state based on the small data indication.

2. The method of claim 1, wherein before receiving the receiving the inactive state command, claim 1 further comprising:
   transmitting an inactive preference indication which indicates a preference for switching from the connected state to an inactive state.

3. The method of claim 1, wherein the connection resume request comprises an identification which is unique within the RNA and is of the user equipment and the small data indication, and claim 1 further comprising:
   returning automatically to the inactive state in response to the transmitting the UL data being completed and the small data indication indicating true.

4. The method of claim 1, wherein the UL data comprises a small data indication, and claim 2 further comprising:
   returning automatically to the inactive state in response to the transmitting the UL data being completed and the small data indication indicating true.

5. The method of claim 1, wherein the connection resume request comprises a buffer state report (BSR), and a size of the UL data is determined according to the BSR.

6. The method of claim 1, wherein a buffer state report (BSR) is not provided to the first base station, and a size of the UL data is determined according to a predefined size.

7. The method of claim 1, wherein the inactive state command further comprises a configuration preservation indication for indicating whether to preserve a connection configuration associated with the wireless connection, and claim 1 further comprising:
   applying the preserved connection configuration without waiting for a new connection configuration in response to the configuration preservation indication that indicates preserving the connection configuration.

8. The method of claim 7, wherein the new connection configuration is received from a connection resume message in response to transmitting the connection resume request.

9. The method of claim 8, wherein the connection resume request is sent to a second base station which also belongs to the RNA.

10. A state transitioning method used by a base station, the method comprising:
    configuring a connected state to establish a wireless connection; and
    transmitting an inactive state command in response to configuring the connected state,
    wherein the inactive state command is received from a first base station from which the wireless connection has been established, the inactive state command comprising information of a radio access network (RAN) based notification area (RNA), and a network criteria which assists a user equipment to determine whether a small data indication indicates true or false based on the network criteria and determine whether to enter the inactive state based on the small data indication.

11. The method of claim 10, wherein before transmitting the inactive state command, claim 10 further comprising: receiving an inactive preference indication which indicates a preference for switching from the connected state to an inactive state, and claim 10 further comprising:

receiving a connection resume request which comprises a buffer status report (BSR); and allocating an uplink grant based on the BSR.

12. The method of claim 10 wherein before transmitting the inactive state command, claim 10 further comprising:
receiving an inactive preference indication which indicates a preference for switching from the connected state to an inactive state, and claim 10 further comprising:
receiving a connection resume request which does not have a buffer status report (BSR); and
allocating an uplink (UL) grant based on a predefined size.

13. The method of claim 10 further comprising:
receiving the small data indication;
performing a path update procedure in response to the small data indication indicating false; and
not performing the path update procedure in response to the small data indication indicating true.

14. The method of claim 13, wherein the inactive state command further comprises a configuration preservation indication for indicating whether to preserve a connection configuration associated with the wireless connection and a network criteria for assisting an external device to determine whether to set the small data indication to indicate true or false.

15. The method of claim 14 further comprising:
transmitting a connection resume message which comprises a new connection configuration if the configuration preservation indication has not previously indicated to preserve the connection configuration.

16. The method of claim 13 further comprising:
transmitting a path update request to another base station for implementing the path update procedure; and
forwarding UL data associated with the UL grant to the another base station.

17. The method of claim 10 further comprising:
receiving a user equipment (UE) context forward request;
storing an identification (ID) which is unique within a a radio access network (RAN) based notification area (RNA) and is of the UE and comprised by a RNA information which comprises a list of cell IDs with in the RNA or a list of area IDs, and wherein a cell within an area ID is the list in the RNA, and the area ID is broadcasted by the cell; and
transmitting a UE context forward acknowledgment.

18. The method of claim 10, wherein inactive state command comprises information of a radio access network (RAN) based notification area (RNA), wherein the information of the RNA comprises a list of cell IDs with in the RNA or a list of area IDs, and wherein a cell within an area ID is the list in the RNA, and the area ID is broadcasted by the cell.

19. A user equipment comprising:
a wireless transceiver; and
a processor coupled to the transceiver and configured to:
establish, via the transceiver, a wireless connection to enter into a connected state;
receive, via the transceiver, an inactive state command while being in the connected state;
enter into the inactive state in response to receiving the inactive state command;
transmit, via the transceiver, a connection resume request while being in the inactive state;
receive, via the transceiver, an uplink (UL) grant which corresponds to the connection resume request; and
transmit, via the transceiver, UL data in response to receiving the UL grant,
wherein the inactive state command is received from a first base station from which the wireless connection has been established, the inactive state command comprising information of a radio access network (RAN) based notification area (RNA), and a network criteria which assists the user equipment to determine whether a small data indication indicates true or false based on the network criteria and determine whether to enter the inactive state based on the small data indication.

* * * * *